United States Patent [19]
Klinner

[11] Patent Number: 4,516,390
[45] Date of Patent: May 14, 1985

[54] APPARATUS AND METHOD OF PICKING UP AND CONVEYING CUT CROP

[75] Inventor: Wilfred E. Klinner, Milton Keynes, England

[73] Assignee: National Research Development Corporation, London, England

[21] Appl. No.: 408,883

[22] Filed: Aug. 17, 1982

Related U.S. Application Data

[63] Continuation-in-part of Ser. No. 173,136 filed as PCT. GB 79/00053, Mar. 30, 1979, published as WO 79/00863, Nov. 1, 1979, § 102(e) date Nov. 30, 1979 abandoned.

[30] Foreign Application Priority Data

Mar. 31, 1978 [GB] United Kingdom ............... 12703/78

[51] Int. Cl.³ ............................................. A01D 89/00
[52] U.S. Cl. .................................. 56/364; 56/DIG. 2; 56/400
[58] Field of Search .............. 56/DIG. 2, 1, 14.5, 56/16.4, 16.5, 400, 126, 128, 13.6, 192, 364, 372

[56] References Cited

U.S. PATENT DOCUMENTS

| | | | |
|---|---|---|---|
| 1,272,665 | 7/1918 | Isom | 56/126 |
| 2,270,646 | 1/1942 | Campbell | 56/14.5 |
| 3,126,693 | 3/1964 | Renn | 56/400 |
| 3,487,612 | 1/1970 | Keller et al. | 56/DIG. 1 |
| 3,699,755 | 10/1972 | Houser | 56/16.4 |

FOREIGN PATENT DOCUMENTS 2067438 of 1971 France .

*Primary Examiner*—Jay N. Eskovitz
*Attorney, Agent, or Firm*—Cushman, Darby & Cushman

[57] ABSTRACT

In apparatus for picking up and conveying cut crop, a conveying rotor is mounted on a mobile frame which is moved over the ground, and is rotated in a manner such as to pick up previously cut crop lying on the ground and to convey the crop upwardly and rearwardly over the rotor and along a passage of the mobile frame. The rotor is a brush-like structure having a multiplicity of stiff, resilient, elongate elements which are yieldable in response to engagement with the crop but are sufficiently stiff to penetrate at least part of a stream of crop conveyed by the rotor. The elements pick-up and convey crop by an action including relative movement between the conveying elements and the crop engaged thereby. The elements are arranged in tufts of element supported and protected at the base by a sleeve, and the tufts are spaced apart in the direction of the rotor axis. In other arrangements the elements may be arranged with individual elements spaced apart in the direction of the rotor. Also the rotor may pick-up cut crop from a cutting mechanism.

21 Claims, 32 Drawing Figures

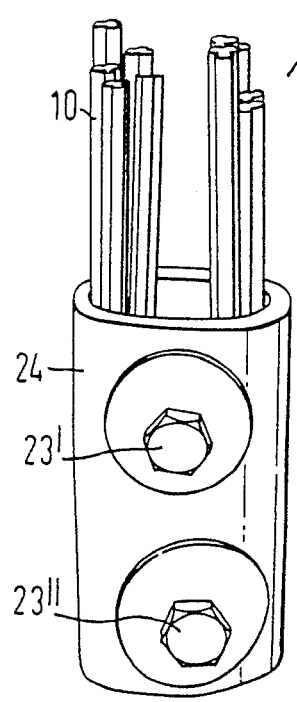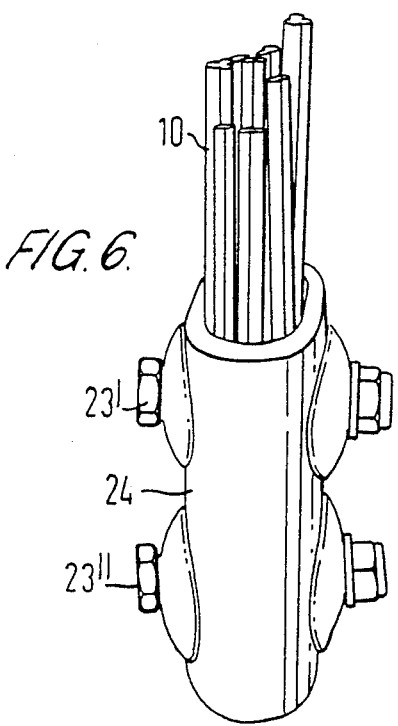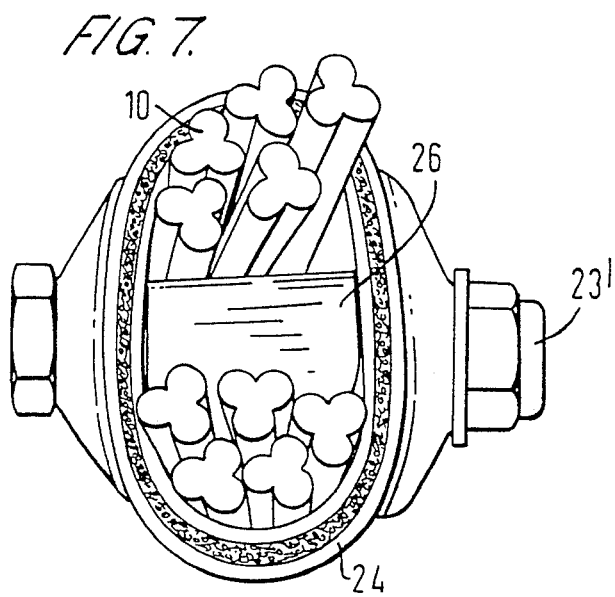

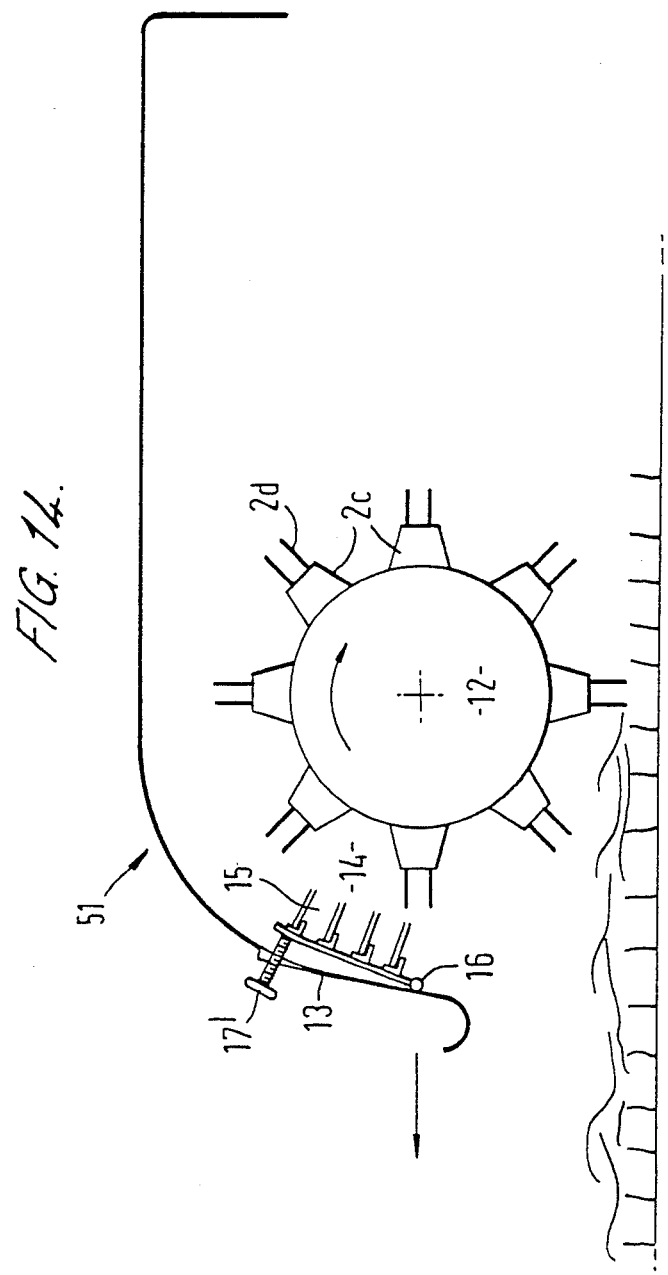

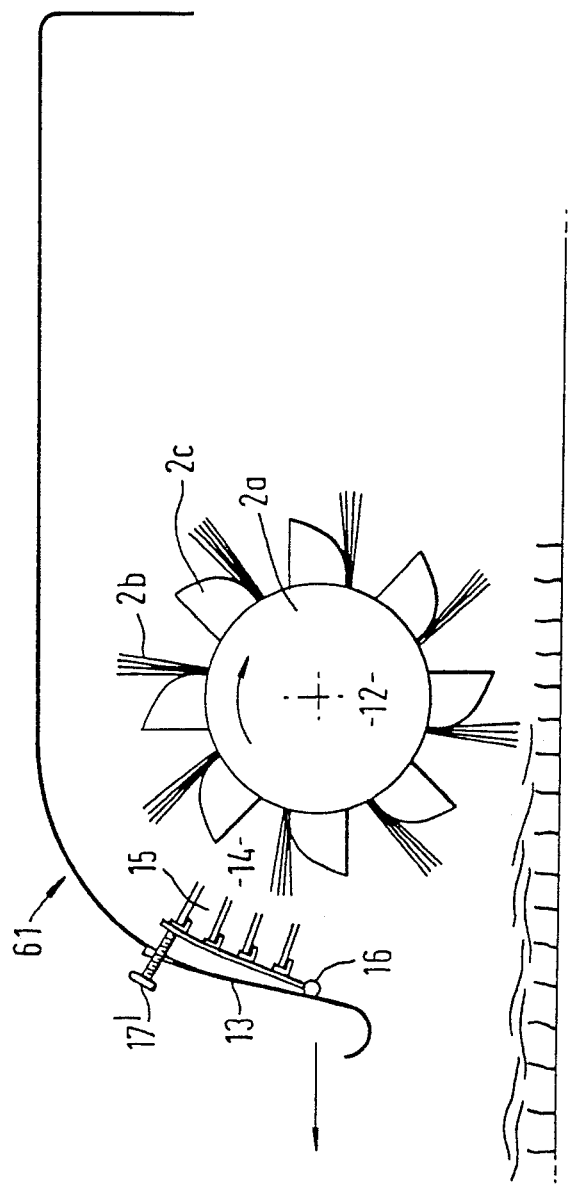

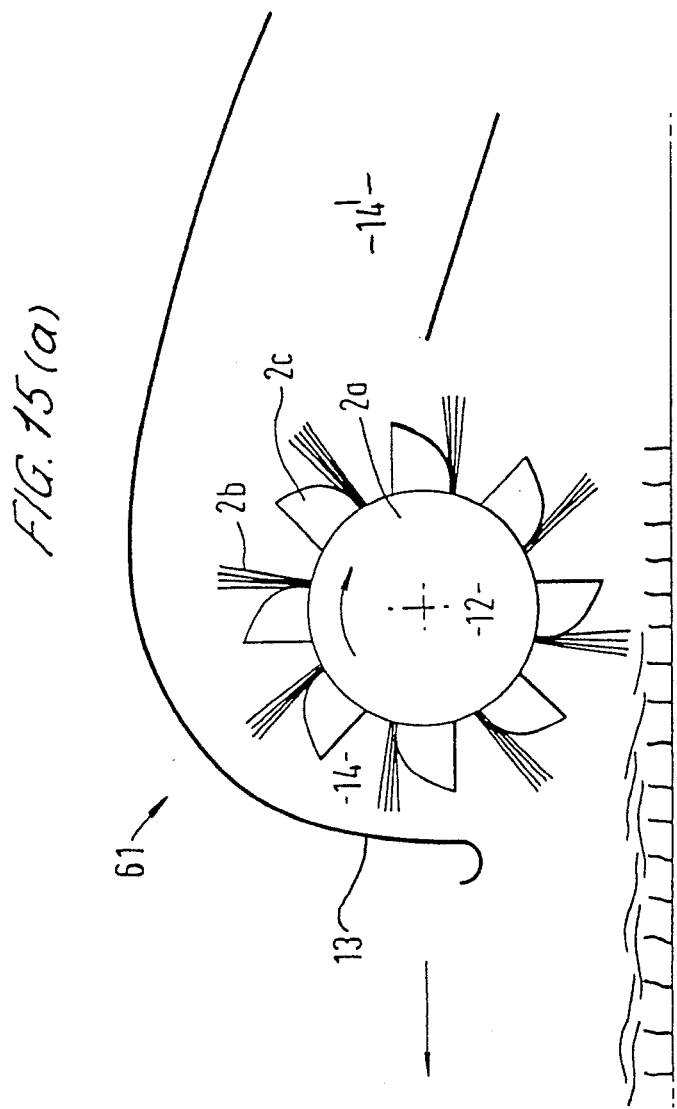

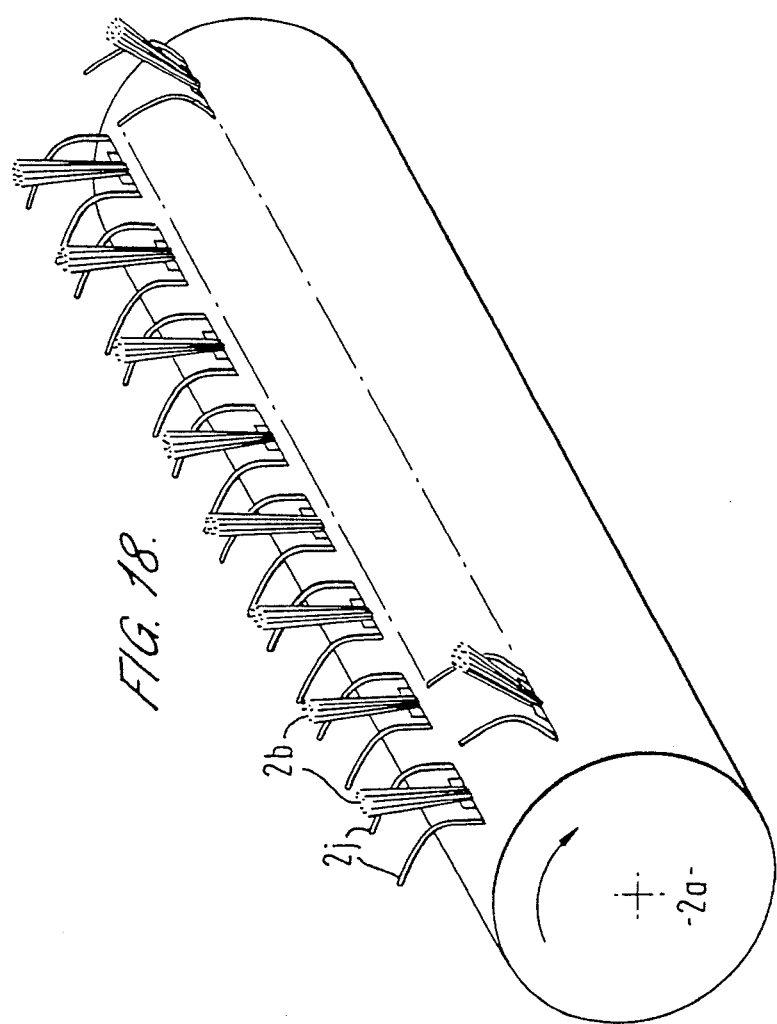

APPARATUS AND METHOD OF PICKING UP AND CONVEYING CUT CROP

This is a continuation-in-part application of Ser. No. 173,136 filed as PCT GB 79/00863, Nov. 1, 1979, § 102(e) date Nov. 30, 1979.

BACKGROUND OF INVENTION

The present invention relates to the conveying of crops especially, but not exclusively, grasses, and provides an improved apparatus for and method of picking up and conveying cut crop.

In some cases the use of apparatus embodying the present invention may produce a treatment of crop which is generally known as conditioning, and various references are made in this specification to conditioning of crop.

The speed at which surface and sap moisture evaporate from cut crop during field exposure depends inter alia on the physical condition of the crop. The principal barrier to moisture loss is the cuticle and the layer of epicuticular wax on the crop surface, and it is now common practice in agriculture to mechanically treat the crop in order to damage this barrier. Such mechanical treatment, which may take the form of crushing, lacerating, bruising, splitting, bending or scuffing the stem and leaves of the crop, is known as "conditioning".

In the specification of our British Patent No. 2041713, from which the present application is divided, the conditioning of crops is more fully described, and there are claimed improved apparatus for and methods of conditioning crop in accordance with the invention of that patent.

However, the present invention is directed to improved apparatus for and methods of picking up and conveying crop, whether or not conditioning of the crop also takes place.

DESCRIPTION OF PRIOR ART

There are two known forms of rotary pick-up apparatus which utilise a brush-like structure. One such apparatus is a runway sweeping brush which comprises a cylindrical rotor of perhaps 6 ft in width and 3 ft in diameter which is rotated about an axis parallel to the ground in close proximity to the ground. The rotor is mounted angled to the line of travel on a mobile frame which is powered to travel along runways at airports, and the rotor is rotated in the overshot mode, that is to say in a direction such that at the lowermost point the tips of the brush elements move in the same direction as the forward direction of movement of the apparatus. The brush rotor is in the form of a uniform densely populated brush with adjacent brush elements touching each other over at least part of the lengths thereof. The tips of the brush elements are arranged in generally random manner and present a dense mass of outer tips. The object of the apparatus is to sweep up debris from the runway, including particulate material such as gravel, dirt, stones and so on. The brush is designed to sweep such debris off the relatively hard smooth surface of the runway and to the sides.

Another type of known pick-up apparatus which utilises a brush-like structure is a leaf sweeper for use in picking up fallen leaves from lawns. In such apparatus a brush rotor is provided in close proximity to the ground and again is rotated about a horizontal axis. The brush rotor is coupled by chains or gear wheels to the ground wheels of the sweeper so that when the sweeper is pushed forwardly by hand the rotation of the ground wheels rotates the brush rotor. The rotation is in the overshot mode, that is to say that rotation of the brush rotor lifts leaves upwardly and rearwardly over the rotor, and the leaves are then deposited in a collecting bag at the rear of apparatus. The brush rotor usually has the form of four rows of bristles aligned transversely across the rotor along the direction of the axis of rotation of the rotor. That is to say that each row of bristles extends in a radial plane in the manner of a paddle wheel. The bristles in each row are densely packed together in touching relationship along the axis of rotation of the rotor. The manner of operation is that each row or bank of bristles scoops up leaves which are carried upwardly and rearwardly in the space or pocket formed between succeeding rows of bristles. The leaves are then emptied at the rear of the apparatus by the leaves being dropped and thrown into the collecting container. Although the apparatus is designed to pick-up from a lawn, it is designed to pick-up relatively large discrete items such as leaves from a surface comprising relatively short uniform grass.

SUMMARY OF INVENTION

According to the present invention there is provided apparatus for picking up and conveying crop comprising a mobile frame for movement over the ground and having a passage along which crop is to be conveyed, a crop conveying rotor for engaging cut crop, and drive means for rotating the crop conveying rotor about an axis substantially parallel to the ground in such a manner as to pick-up cut crop and convey the crop along the passage, the conveying rotor comprising a brush-like structure having a multiplicity of stiff, resilient, outwardly directed, elongate elements for picking up and conveying the crop by an action including relative movement between the conveying elements and the crop engaged thereby, the elements being yieldable in response to engagement with the crop but being sufficiently stiff to penetrate at least part of a stream of crop conveyed by the rotor, the elements being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements, the individual crop engaging elements, or discrete tufts of the elements, being spaced apart from each other in the direction of the axis of rotation of the rotor.

There is also provided in accordance with the present invention a method of picking up and conveying cut crop comprising the steps of rotating a crop conveying rotor about an axis which is substantially parallel to the ground, the conveying rotor comprising a brush-like structure having a multiplicity of stiff, resilient, outwardly directed elongate elements, and picking up and conveying cut crop by the rotor in an action including relative movement between the conveying elements and the crop engaged thereby, in which the stiff, resilient, elongate elements are yieldable in response to engagement with the crop but are sufficiently stiff to penetrate at least part of a stream of crop conveyed by the rotor, in which the elements yield at least predominantly by bending of the elements along at least part of the crop engaging portions of the lengths thereof, and in which the elements return to their undeflected dispositions when free from engagement with the crop at least predominantly by the effect of the stiffness of the elements, the individual crop engaging elements, or discrete tufts of the elements, being spaced apart from each other in the direction of the axis of rotation of the rotor.

The invention finds particular application in the picking up and conveying of grass, or like crop which includes long fibrous strands of material, and such crop includes alfalfa, lucerne, and other fibrous forage crops.

Thus there is also provided in accordance with the invention a method of picking up and conveying cut grass or like fibrous crop comprising the steps of rotating a crop conveying rotor about an axis which is substantially parallel to the ground, the conveying rotor comprising a brush-like structure having a multiplicity of stiff, resilient, outwardly directed elongate elements which are spaced apart from each other in the direction of the axis of rotation of the rotor, and picking up and conveying cut grass or like fibrous crop by the rotor in a brushing action which comprises producing relative movement between the conveying elements and the stream of crop, producing yielding of the stiff, resilient, elongate elements in response to engagement with the crop at least predominantly by bending of the elements along at least part of the crop engaging portions of the lengths thereof, effecting return of the elements to their undeflected dispositions when free from engagement with the crop at least predominantly by the effect of the stiffness of the elements, penetrating at least part of the stream of grass or like fibrous crop by the action of the said spaced apart stiff, resilient elements, and subsequently releasing the cut grass or like fibrous crop from the said spaced apart stiff resilient elements at least partly by the effect of centrigual force on the crop.

There is further provided in accordance with the invention a method of picking up and conveying cut grass or like fibrous crop, comprising the steps of rotating a crop conveying rotor about an axis which is substantially parallel to the ground, the conveying rotor comprising a brush-like structure having a multiplicity of stiff, resilient, outwardly directed elongate elements which are arranged in discrete tufts of elements, the discrete tufts of elements being spaced apart from each other in the direction of the axis of rotation of the rotor, and picking up and conveying cut grass or like fibrous crop by the rotor in a brushing action which comprises producing relative movement between the conveying elements and the stream of crop, producing yielding of the stiff, resilient, elongate elements in response to engagement with the crop at least predominantly by bending of the elements along at least part of the crop engaging portions of the lengths thereof, effecting return of the elements to their undeflected dispositions when free from engagement with the crop at least predominantly by the effect of the stiffness of the elements, penetrating at least part of the stream of glass or like fibrous crop by the action of the said spaced apart tufts of stiff resilient elements, and subsequently releasing the cut grass or like fibrous crop from the said spaced apart tufts of stiff resilient elements at least partly by the effect of centrifugal force on the crop.

It will be appreciated that the invention is distinguished from the prior art devices set out herein before in several aspects. The brush elements of the present invention penetrate and move through the stream of crop being conveyed, and the individual brush elements, or the discrete tufts of elements, are spaced apart transversely across the crop flow along the direction of the axis of rotation of the rotor. These features have several advantages when picking up elongate fibrous crop such as grass. The spaced apart brush elements or tufts facilitate pick-up fibrous crop and reduce pick-up of soil and unwanted objects heavier than crop. The spaced apart elements or tufts facilitate pick-up of fibrous crop from stubble by a brushing and combing action. The penetration of the crop stream and relative movement between the brush elements and the crop being conveyed produces a teasing out of the crop into an easily conveyed stream and allows stones and soil to fall free. The spaced apart bristles or tufts also facilitate the subsequent release of the fibrous crop from the brush elements, either by centrifugal force alone or by an additional stripper and transfer rotor at the rear. The spaced part brush elements or tufts facilitate pick-up of fibrous crop by an effect referred to as "hair pinning", in which strands of crop, for example stems, are caught and sometimes bent around a brush element or tuft of elements. The strands are accelerated in this way and almost immediately released again so that they are freely suspended at the rear of the rotor.

The previously known pick-up devices set out above are different both in purpose and construction. In both the runway brush and the leaf sweeper described it would not be possible to pick-up and convey crop such as grass. The fibrous strands of crop would not be picked-up successfully by the densely packed bristles, especially when picking up from stubble, and the fibrous crop would not be satisfactorily released from the rotors. The crop would wrap around and along the brush rotors of the known devices which would become ineffective to collect further crop. The densely packed brush elements of the prior art devices would also pick-up much extraneous debris such as soil and stones.

Apparatus embodying the invention has particular effect where the brush elements are arranged in spaced apart tufts of elements for picking up cut crop from ground stubble. Preferably the axial positions of the brush tufts are staggered around the rotor in such a manner that upon rotation of the rotor the gaps between the spaced-apart tufts presented to the crop are filled at least partly by succeeding tufts presented to the crop during the rotation, and thus in effect all the stubble area beneath the rotor is brushed clean. This is in contrast to conventional tine-bar type pick-up mechanisms which use coiled wire tines and which follow each other circumferentially and are spaced fixed distances apart laterally. It is this lateral spacing which leads to crop losses particularly at fast forward speeds and when the crop is aligned in the direction of travel. Correctly designed brush rotors do not have these performance limitations. They can also be set to operate higher above the ground than conventional pick-ups and have been found to reduce the uptake of silica with the crop.

There will now be described in more detail various features of the brush like structure of the present invention, and various preferred and optional arrangements in accordance with the invention.

Where reference is made to the elements being sufficiently stiff to return to their undeflected dispositions at least predominantly by virtue of the stiffness of the elements, it is to be appreciated that the base of an element may be secured to a support member by a mounting which has itself a degree of resilience, for exampe by being clamped to a support member by clamping means including resilient material. Such a resilient mounting may contribute to the return of an element to its undeflected disposition, but it is a feature of the present invention that the elements are sufficiently stiff to return to their undeflected dispositions predominantly by virtue of the stiffness of the elements. Where, as will be described hereinafter, the elements are mounted in tufts with a plurality of elements set closely together, it will be appreciated that adjacent elements will assist each other in the return to an undeflected disposition when free from engagement with crop, but again it will be appreciated that this return is effected predominantly by virtue of the stiffness of the elements. Similarly, the return of the elements to their undeflected dispositions may be assisted by the effects of centrifugal force, but again the elements are returned predominantly by virtue of the stiffness of the elements.

It is particularly advantageous that the elements of the brush like structure are yieldable in directions lying in more than one plane. Thus in operation the main deflection of the elements takes place along the general direction of movement of the crop through the crop passage, but it is also possible for the elements to deflect sideways relative to the main direction of the crop flow.

The elements of the rotor may be arranged in groups spaced apart along rows parallel to the axis of the rotor and angularly spaced around the rotor. These rows may each contain gaps through which crop can pass, but the groups of elements can be staggered in position from one row to the next around the rotor so that the gas in one row are effectively blocked by one or more groups of elements in succeeding rows. Conveniently the groups of elements can be arranged in a spiral pattern, but other patterns may be used.

Conveniently the elements may be arranged in a brush of conventional form, that is to say in which groups of elements are mounted together in tufts, and the positions of the tips of the elements are to at least some extent random. However other forms of brush will readily be apparent, and in particular the brush may comprise elements which are disposed in a regular, non-random, pattern.

It is further preferred that the crop engaging elements are yieldable by bending substantially along the whole of the free lengths thereof.

In one form, the tips of the elements may be distributed substantially uniformly and the population of the elements at the tips may lie in the range 1 to 20 elements per sq.cm., preferably in the range 1 to 10 elements per sq.cm., or in the range 4 to 16 elements per sq.cm. In another form the elements may be arranged in spaced-apart tufts of elements and the population of the elements in each tuft at the tips may be less than 1 element per sq. cm., or may lie in the range 1 to 20 elements per sq.cm., preferably in the range 1 to 10 elements, or in the range 4 to 16 elements per sq. cm.

Conveniently each tuft may be formed of one or more lengths of element material doubled over and secured to a supporting base in the region of the fold of the doubled over element length or lengths. Alternatively the elements may be constructed by moulding or otherwise preforming plastics or other resilient material.

Also conveniently each element or group of elements in a tuft may be supported and protected at the base thereof by a sleeve of resilient material. Such a sleeve may provide a resilient mounting for the elements such as has already been referred to.

In order to reduce the risk of the elements being dislodged or breaking in use, it may be convenient in some arrangements that their bases are protected by respective shrouds against impact by material, especially extraneous material such as stones. The shroud suitably can be constituted by an upstanding wall located forwardly (with respect to the movement of the crop relative to the element) of the respective element or element row and projecting for only the lower part of the element length. It is also advantageous to provide in some circumstances a support rearwardly (with respect to the movement of the crop relative to the element) of the respective element or element row to limit the extent to which the element can bend and thereby reduce the risk of fatigue. Said support can readily be provided by an upstanding wall constituting a shroud for the next following element or element row. In addition or alternatively to the provision of a support to limit element bending, there can be provided stone guards having orifices or recesses to receive respective elements or tufts on limited bending of the latter whilst deflecting stones and other extraneous lumps of matter.

As has been mentioned there are a number of different configurations of the brush which can be used. In some arrangements the rotor may have a plurality of parallel element rows extending laterally, particularly substantially perpendicularly, to the direction of relative movement between the crop and the elements. The spacing of the elements or element tufts may be up to 200 mm, for example 20 to 150 mm, preferably 50 to 150 mm, especially 40 to 130 mm.

The elements can be bristles or rods having, for example, a circular cross-section and a diameter in the range 2 mm to 11 mm, especially 3 to 10 mm. Other diameter ranges may be 2 mm to 8 mm, especially 3 mm to 6 mm. The elements can be of solid or hollow circular or other cross-sectional shape e.g. triangular, rectangular or square, but the presently preferred cross-section is trilobate (i.e. clover leaf or trefoil shape). The elements, especially those of a smaller diameter, can be crimped in order to increase their stiffness and/or can be bunched together to form tufts, as has been mentioned. Conveniently the free bendable length of each element lies in the range 10 to 300 mm, preferably in the range 25 to 250 mm and most preferably in the range 75 to 125 mm. Within each bunch the length and stiffness of the elements may differ.

A preferred range of element cross-sections can conveniently be described by a feature that the ratio of the sides of a rectangular envelope containing a cross-section of an element does not exceed 4 to 1, preferably not exceeding 2 to 1. Another criterion which can be used to establish suitable element dimensions, is that the maximum cross-sectional dimension of an element is preferably in the range 1 to 20 mm, preferably 3 to 10 mm.

It is preferred that there is provided drive means for driving the rotary conveying rotor at a rotational speed of 300 to 1000 r.p.m., preferably 400 to 800 r.p.m. Other ranges may be 400 to 1700 r.p.m., preferably 500 to 1000 r.p.m.

A preferred feature is that with the rotary conveying device there may be provided drive means for driving the rotary conveying device at a rotational speed such as to provide a tip velocity of 7 to 50 m per second at the tips of the elements, most preferably a velocity in the range 10 to 30 m per second, especially a velocity of 15 m per second. Other ranges may be 10 to 50 m per second at the tips of the elements, most preferably a velocity in the range 20 to 30 m per second, especially a velocity of 24 m per second. Conveniently the rotary conveying device has a diameter in the range 350 to 700 mm, especially 450 to 600 mm.

The elements can be formed of any suitable materials, especially synthetic materials such as plastics materials. Plastics materials are preferred because detached or broken elements left in the field or in the crop are less likely to injure livestock should any animal ingest them. Suitable plastics materials include polypropylene and nylon. However in general suitable materials comprise nylon, polypropylene, polyethylene, glass fibre, or carbon fibres, either alone, or when impregnated, studded, layered or tipped with metallic or mineral abrasives, including for example silicon carbide.

In some arrangements, the apparatus is arranged for collection of crop during movement of the frame over the ground and for depositing of crop onto the ground. The rotor may be arranged to pick up previously cut crop lying on the ground, or alternatively the apparatus may include cutting means for cutting crop growing on the ground, the apparatus being arranged for the rotor to engage crop cut by the cutting means.

The cutting means may operate by linear unidirectional movement of cutting elements over the major portions of their cutting paths. Such a cutting means can be provided by a belt or chain cutter in which a belt or chain rotates continuously around two spaced-apart pulleys, and between the pulleys presents to the crop a unidirectionally moving belt or chain carrying cutting knives in a single direction across the path of forward movement of the cutter.

Where there is provided cutting means of the type set out in the preceding paragraph, there may also be provided an advantageous feature of the present invention by arranging circumferentially successive elements of the rotary conveyor in a helical formation in a sense that such as to exert on the crop a movement along the axis of the rotary conveying means opposed to the cutting direction of the said cutting elements.

A guide means defining the crop passage conveniently is provided by a hood or housing enclosing the aforementioned components of the device at least along the path of the crop.

Conveniently, the frame of the apparatus can be a wheeled frame, although the frame can be provided with other ground-engaging means, for example skids, if desired. The frame can be self-propelled or mounted on or towed by a tractor or other vehicle. Alternatively the frame can be fully mounted or semi-mounted on a tractor or be part of a harvesting machine, such as a chopper or baler. The drive for the driven parts of the device, such as the conveying rotary brush, usually will be provided from a power take-off from the engine providing motive power for the frame or the vehicle.

In general, those features of the invention which have been set out above in relation to apparatus aspects of the invention, may also be provided in accordance with method aspects of the invention.

INTRODUCTION OF DRAWINGS

Embodiments of the invention will now be described by way of example with reference to the accompanying drawings in which:

FIGS. 5, 6 and 7 show side, end and plan views respectively of a modified form of a tuft of elements forming part of the apparatus shown in the preceding Figures;

FIG. 1(a) is a diagrammatic side view of a modification of the apparatus shown in FIG. 1;

FIG. 2(a) is a rear view of the apparatus shown in FIG. 1(a);

FIG. 3(a) is a perspective view showing in detail tufts of elements forming part of the apparatus shown in FIGS. 1(a) and 2(a);

Figure 1:
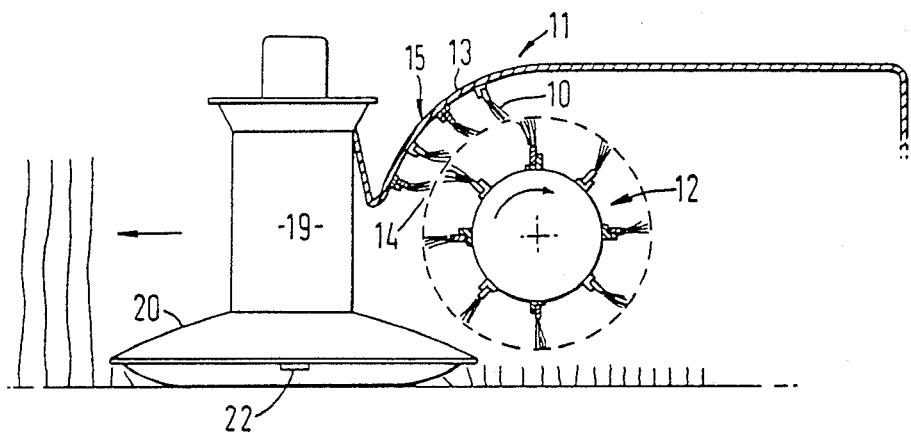
FIG. 1 is a diagrammatic side view of apparatus embodying the invention.
Figure 10:
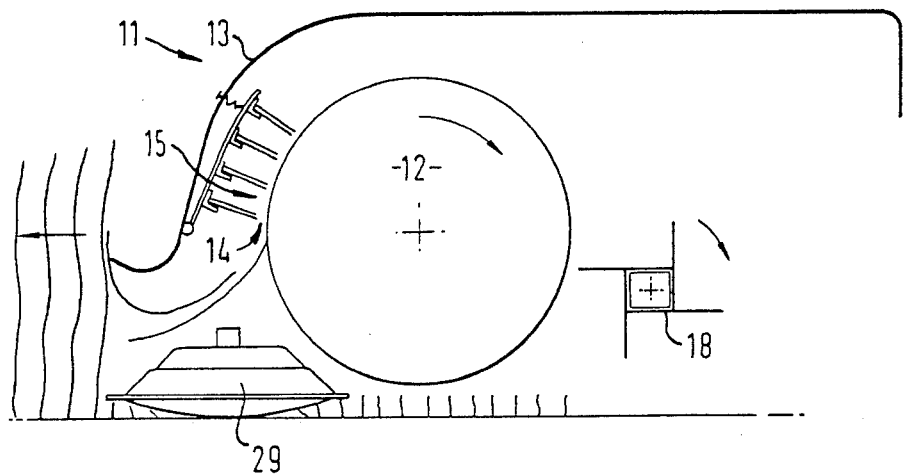
Figure 9A:
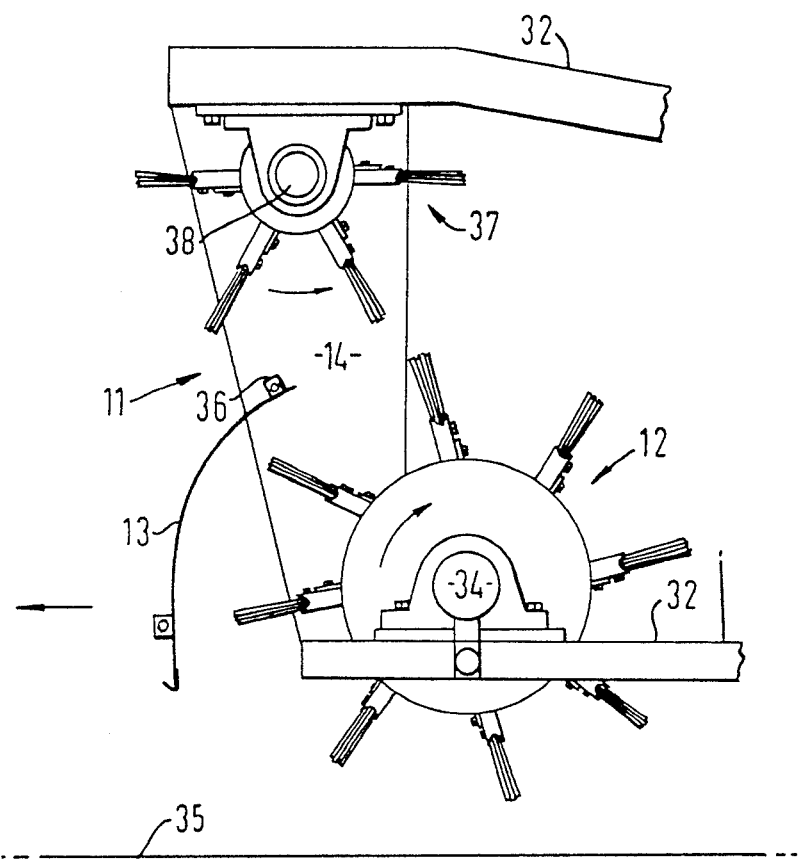
FIG. 9(a) is a side view of apparatus embodying the invention including some components previously shown in the aforesaid Figures, but modified by the addition of a second rotary device.
Figure 9B:
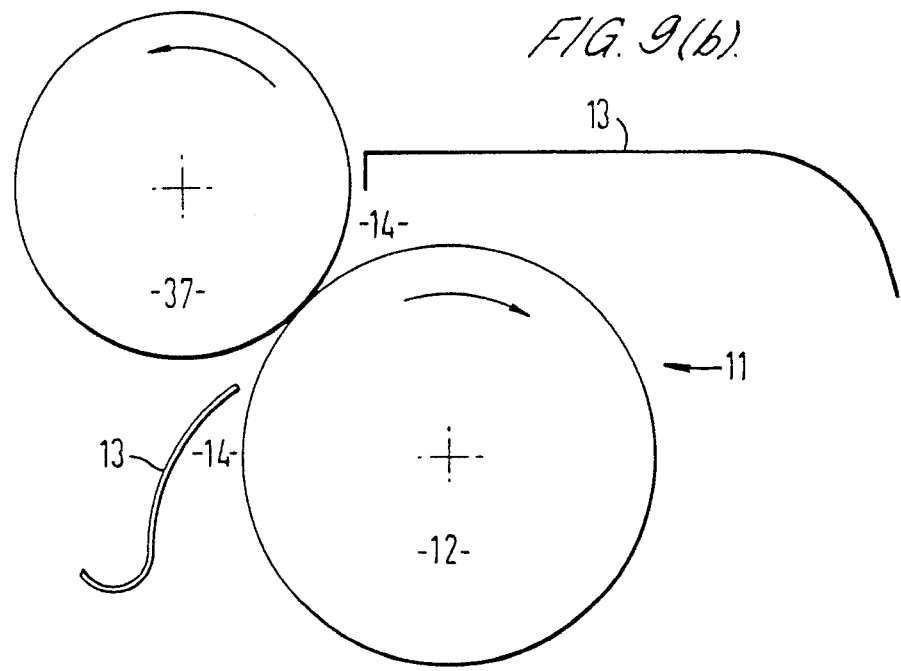
Figure 9C:
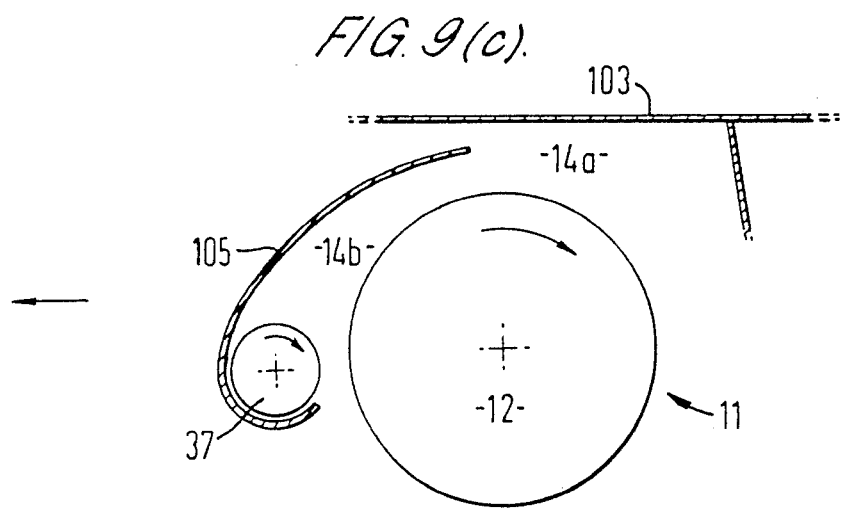
Figure 9D:
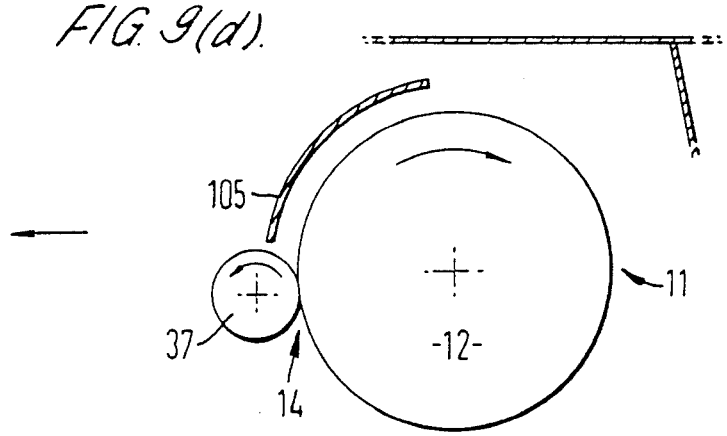
Figure 9E:
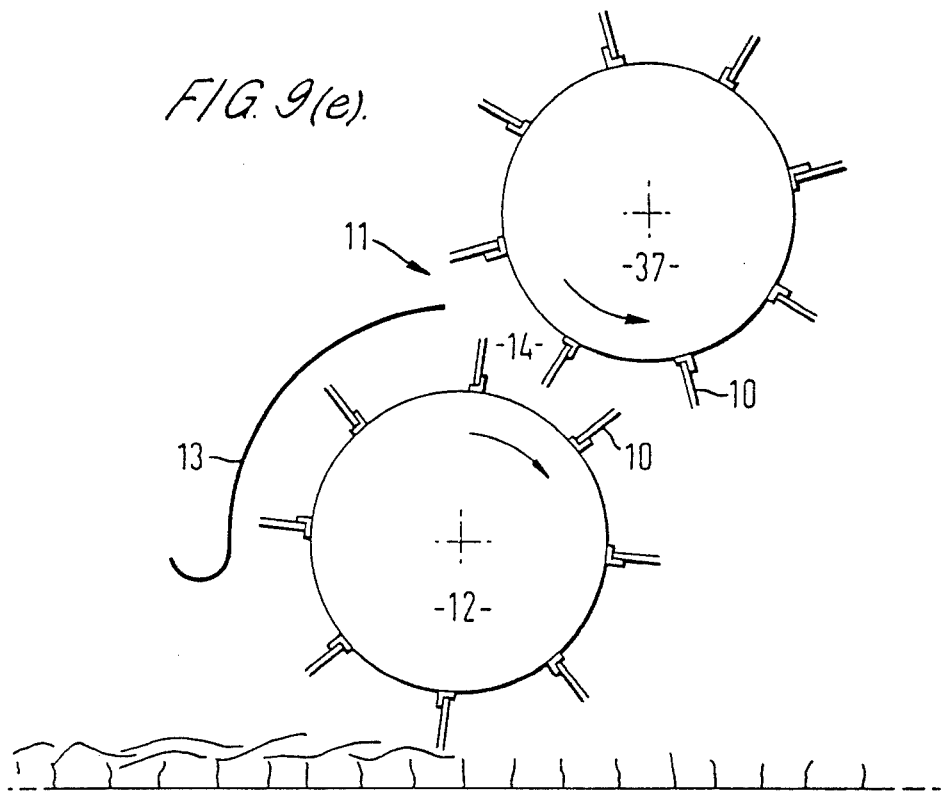
Figure 9F:
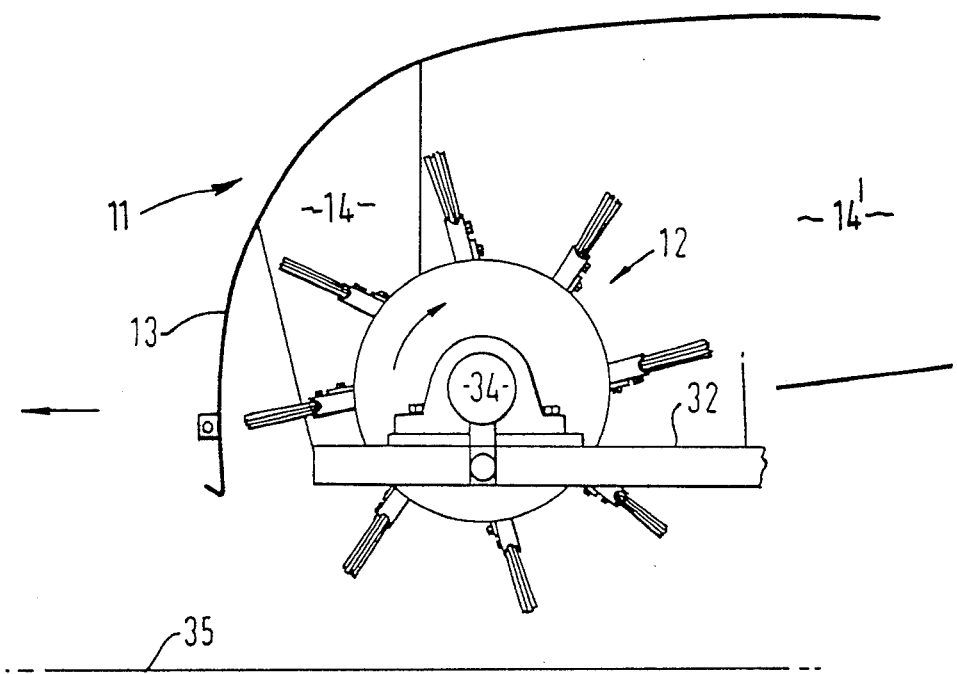
Figure 9G:
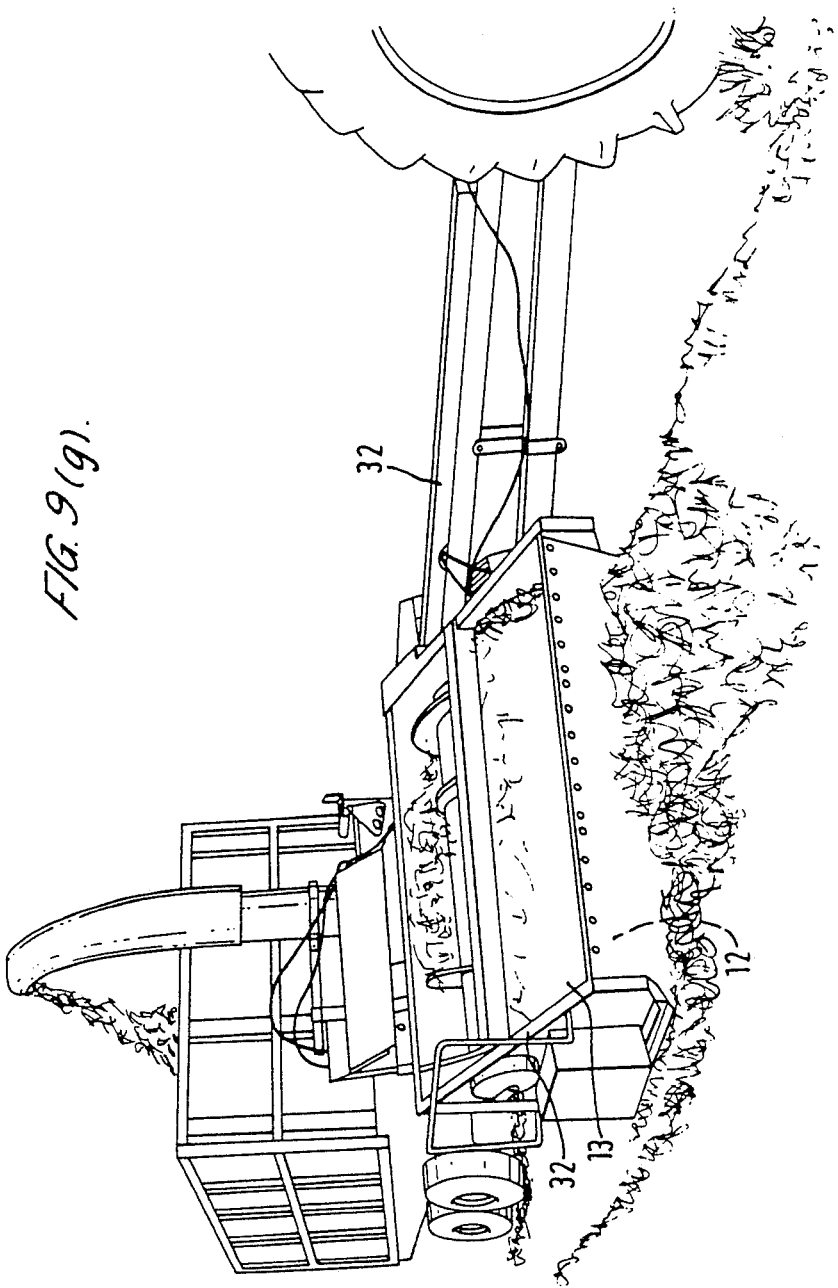
Figure 9H:
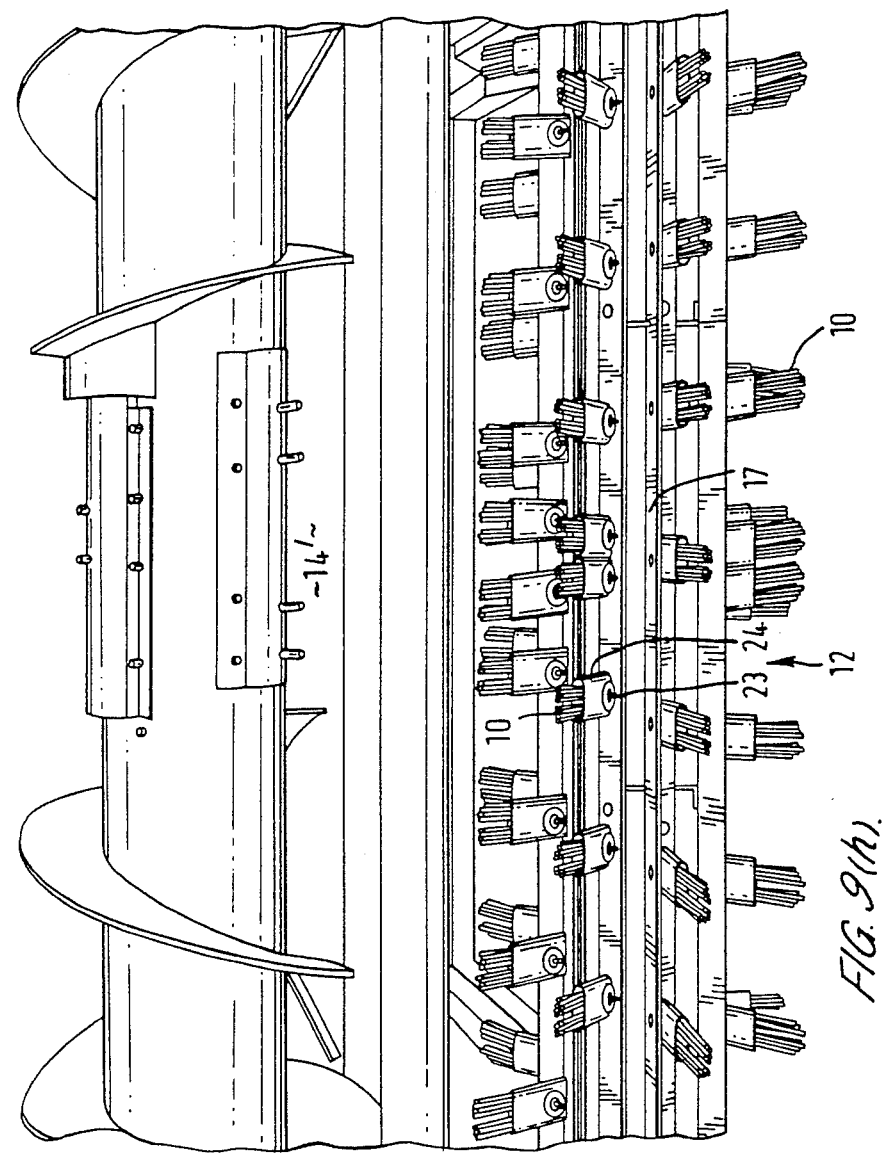
Figure 11:
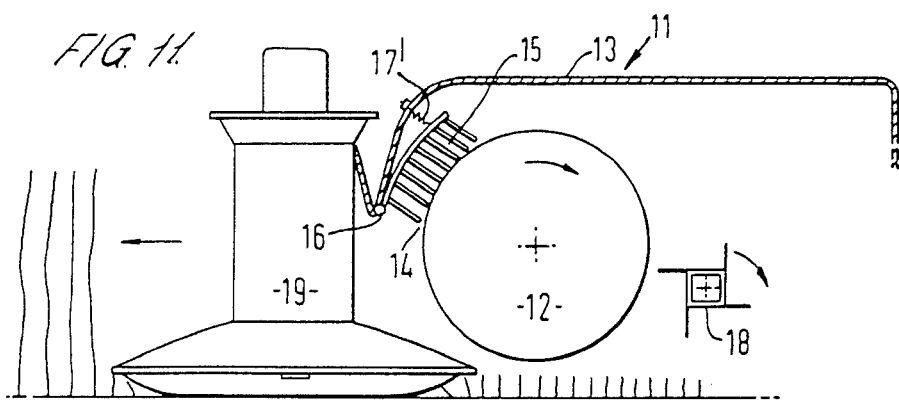
Figure 12:
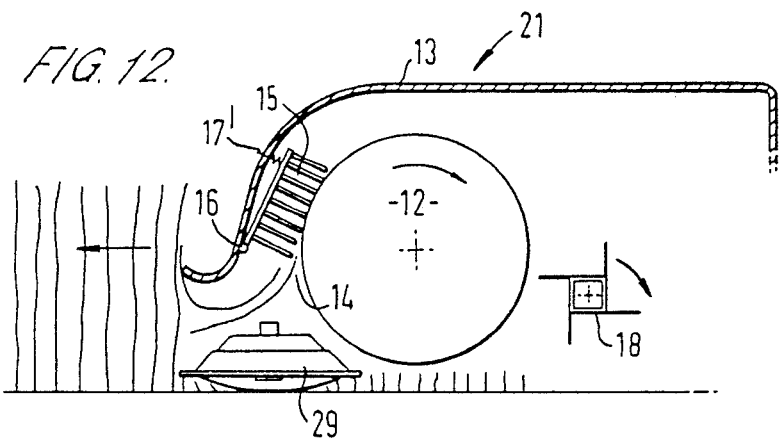
Figure 13:
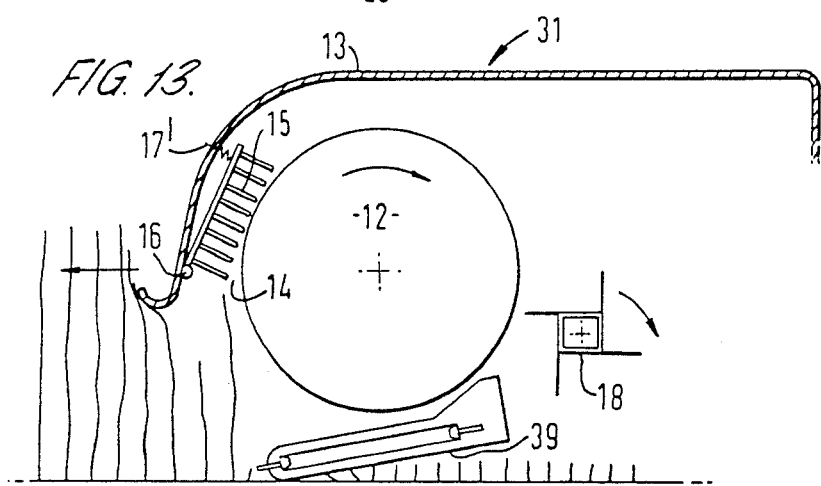
Figure 14A:
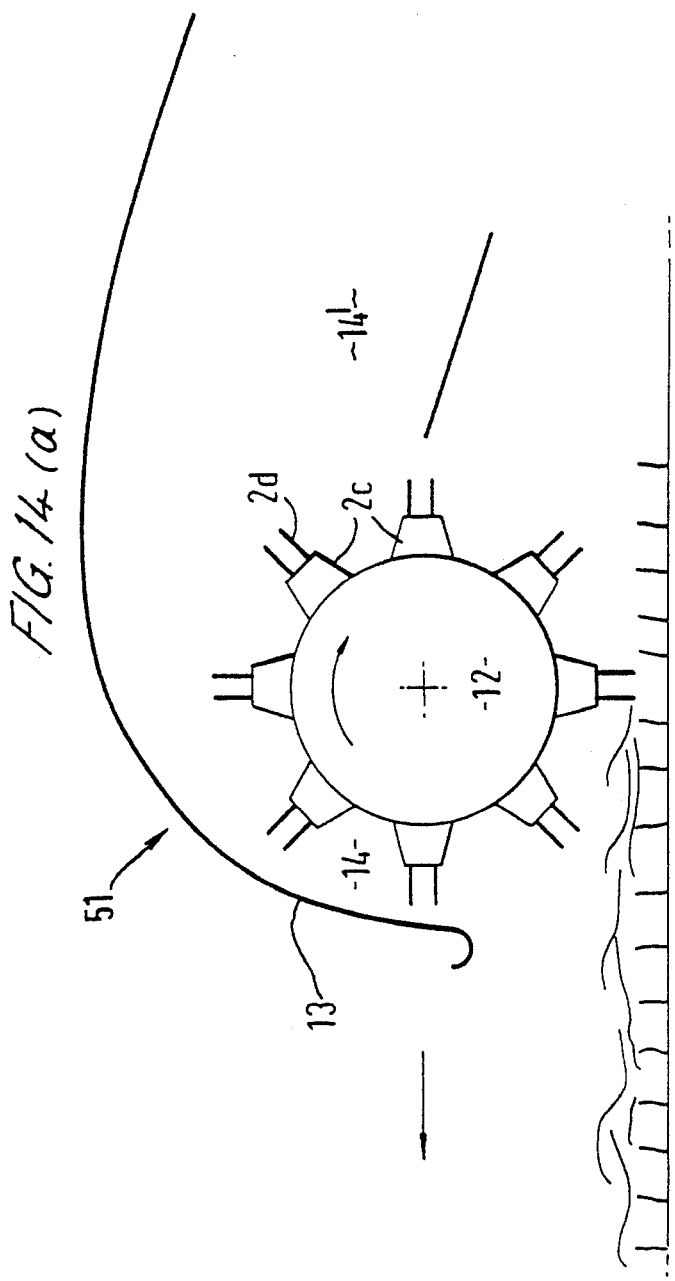
Figure 16:
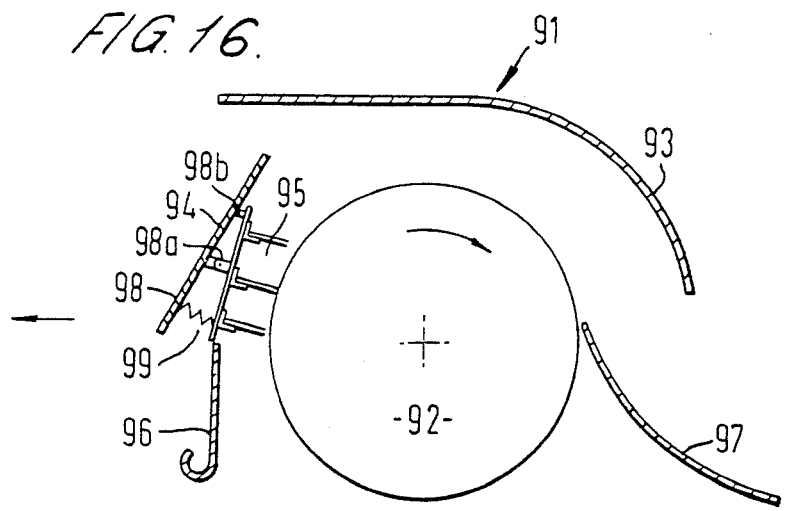

FIGS. 9(b), 9(d) and 9(e) show modifications of the apparatus shown in FIG. 9(a), in which the position of the second rotary device is moved and in FIG. 9(c) also has its direction of rotation reversed;

FIG. 9(f) shows a modification of the apparatus shown in FIG. 9(a), in which the second rotary device is removed;

FIGS. 9(g) and 9(h) show perspective views of a brush rotor as shown in FIG. 9(f) attached to a forage harvester;

FIG. 10 is a diagrammatic side view of a modification of the apparatus of FIG. 1, in which disc mowers are used in the apparatus;

FIG. 11 is a diagrammatic side view of a modification of the apparatus shown in FIG. 1, in whch an alternative form of stationary conditioning device is provided;

FIG. 12 is a diagrammatic side view of a modification of the apparatus of FIG. 11 in combination with a disc mower;

FIG. 13 is a diagrammatic side view of a modification of the apparatus of FIG. 12 in combination with a belt mower;

FIGS. 14 to 16 are diagrammatic side views of further modified forms of apparatus embodying the invention;

FIGS. 14(a) and 15(a) are diagrammatic side views of further modified forms of apparatus embodying the invention, in which the stationary conditioning brushes of FIGS. 14 and 15 are removed.

Figure 17:
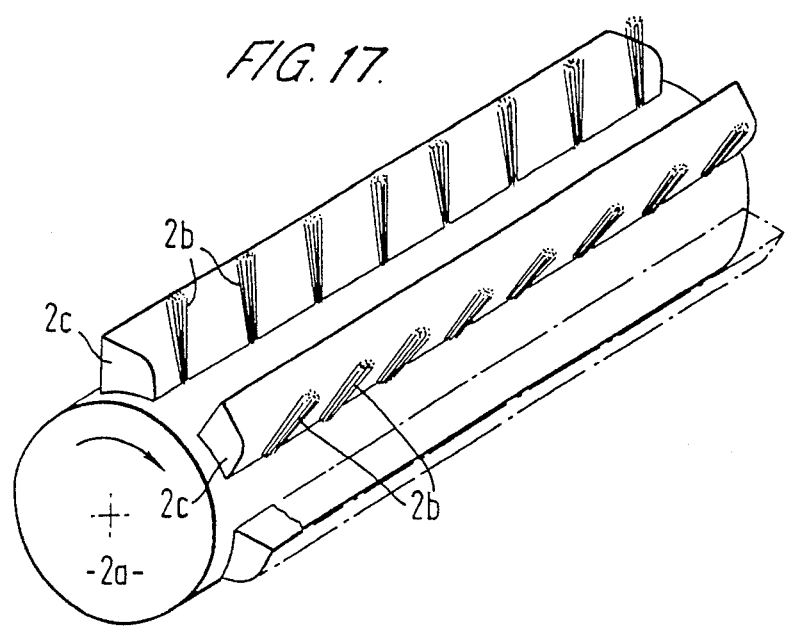

FIG. 17 is a perspective view of a rotary brush embodying the invention of a kind suitable for use in the apparatus shown in FIG. 15; and FIG. 18 is a perspective view of a further rotary brush slightly modified from the brush shown in FIG. 17.

DESCRIPTION OF EMBODIMENTS OF THE INVENTION

In the apparatus and methods to be described with reference to the drawings, the apparatus embodying the invention for picking up and conveying crop also sometimes operates to effect a conditioning action, and consequently various components of the apparatus are referred to as conditioning components. However, as has been mentioned, the present invention is itself concerned with improved apparatus for and methods of picking up and conveying crop, whether or not conditioning takes place.

Referring firstly to FIG. 1 there is shown diagrammatically in side view and partly in section, apparatus for picking up and conveying crop in accordance with one preferred embodiment of the invention, the apparatus also constituting crop conditioning apparatus. The apparatus is indicated generally by the reference numeral 11 and comprises a driven rotary brush indicated generally at 12. The brush 12 is covered by a hood 13 which defines therewith a passage 14 through which cut crop is to be conveyed by the brush 12. An arcuate stationary brush indicated generally by the reference numeral 15 is secured to the underside of the hood 13 and extends along the passage 14 to restrain the crop flow therethrough.

Each of the brushes 12 and 15 embodies a conditioning device and comprises rows of stiff, resilient, elongated conditioning elements 10 which in the following description will be referred to as brush filaments, the term filament merely being used to indicate an elongate element such as may be produced of synthetic plastics material. As will be appreciated from the following description, the filaments are stiff elements, the term filaments merely indicating the elongate nature of the element. The brush filaments 10 may for example be made of polypropylene or nylon, and are yieldable generally in the longitudinal direction of the passage 14 but also in response to forces from other directions. In the case of the rotary brush 12, the filaments 10 will yield at least in the anticlockwise sense as viewed in the Figure when the brush is rotated in the direction of the arrow as shown. The filaments of the stationary brush 15 will yield at least in the opposite sense when viewed in the said direction.

As will become apparent, the brushes 12 and 15 can each be formed in a number of alternative arrangements as will be described hereinafter, but for the sake of simplicity the embodiment will firstly be described with the brushes 12 and 15 constructed in the same manner.

Figure 2:
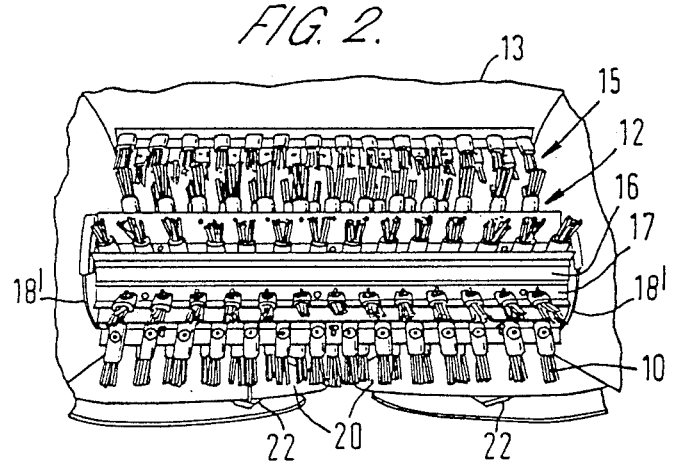
FIG. 2 is a rear view of the apparatus shown in FIG. 1.
Figure 1:
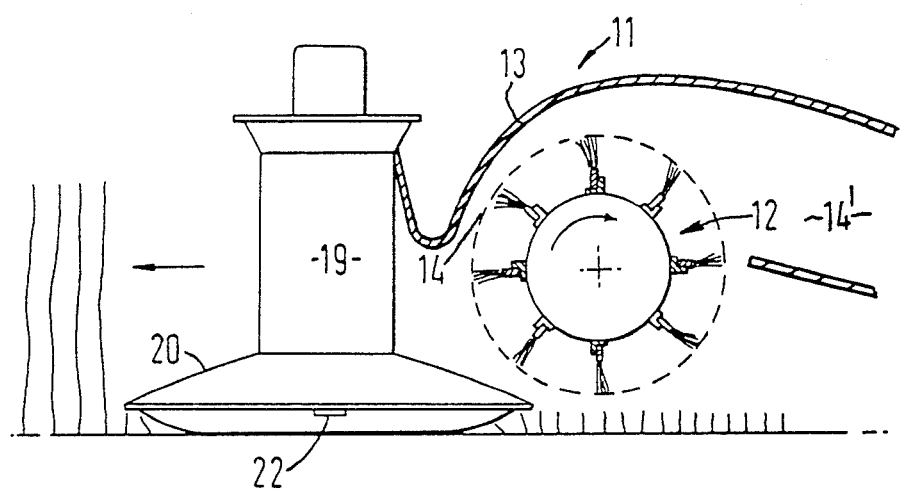
Figure 2:
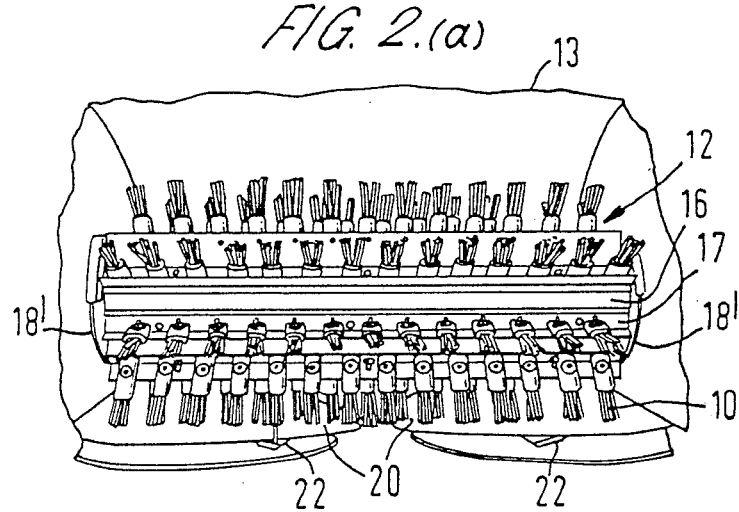

FIG. 2 shows a perspective rear view of the rotary brush 12 and the stationary brush 15, viewing the brushes under the rear part of the hood 13.

Figure 3:
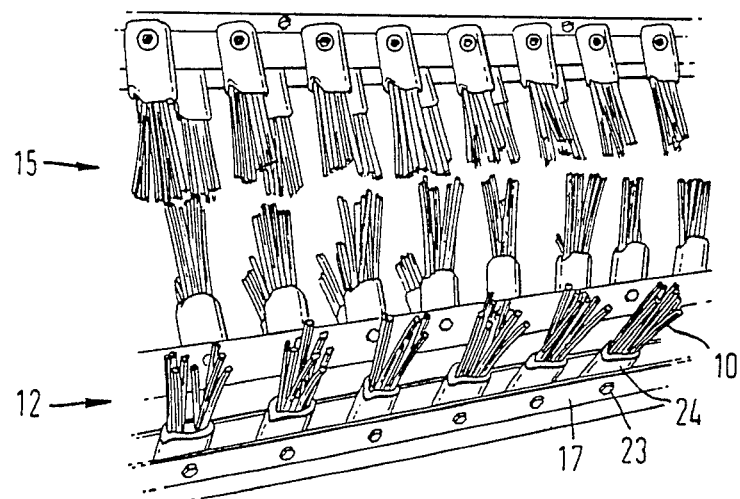
FIG. 3 is a perspective view showing in detail tufts of elements forming part of the apparatus shown in FIGS. 1 and 2.
Figure 4:
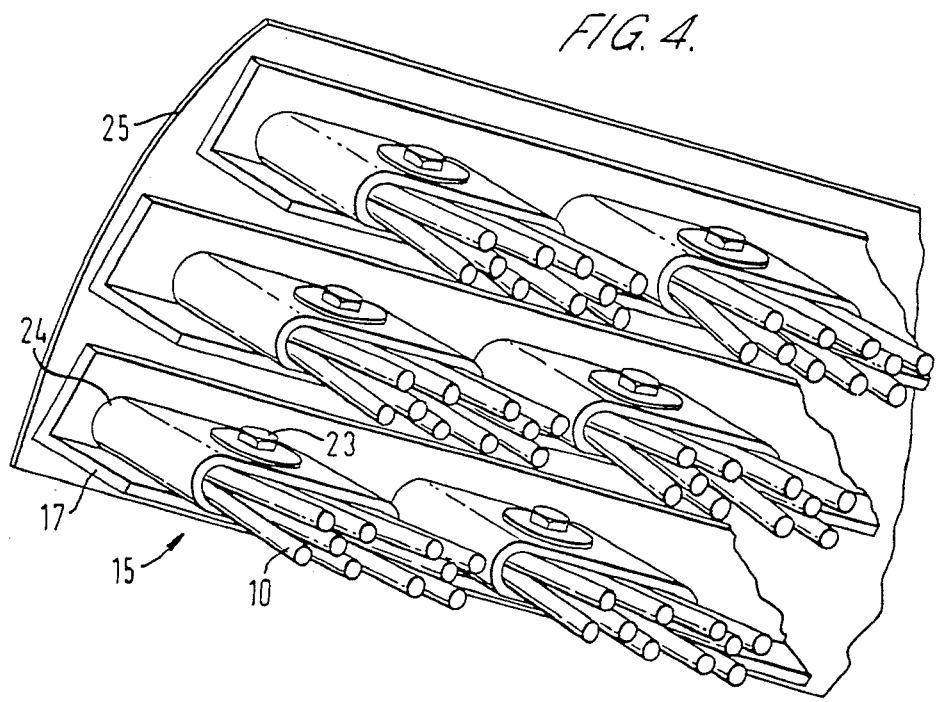
FIG. 4 is a perspective view of the underside of a stationary crop conditioning device shown in FIGS. 1, 2, and 3.
Figure 3:
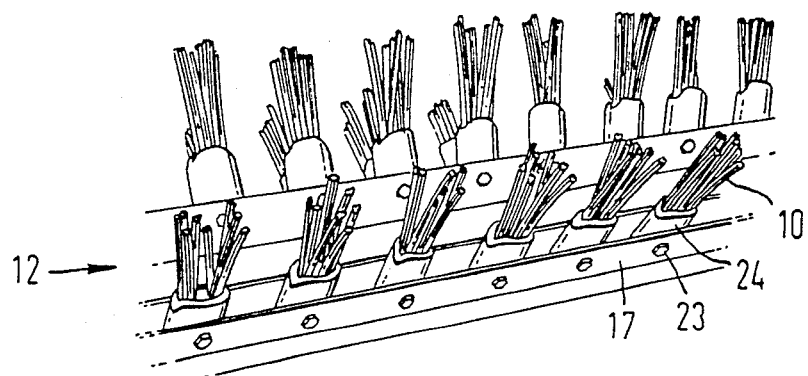

FIG. 3 shows a detail of a construction of mounting means for the filaments, and FIG. 4 shows a detail of the construction of the stationary brush 15.

With reference to FIGS. 2 and 3 there will firstly be described the construction of the rotary brush 12. The brush 12 consists of a support rotor 16 formed by eight axially extending angle iron bars 17 fixed between end side plates 18'. The support rotor 16 is mounted for driven rotation on a main frame (not shown) of the apparatus which also supports for driven rotary movement (in known manner) a pair of cutting drums 19 shown generally in FIG. 1. The skirts 20 and cutting elements 22 of the drums 19 are visible in FIG. 2 beneath the rotary brush 12.

Mounted on each angle bar 17 is a row of tufts of filaments 10. Each tuft is formed from a bundle of filaments lengths which are bent over into a U-shape and secured to the bar 17 by a bolt 23 passing through a supporting and protective sleeve 24 for each tuft. The sleeve conveniently consists of reinforced rubber or plastic tubing, the outer rubber layer being reinforced by fibrous threads running along the length of the tubing or hose. As shown in FIG. 3, the single bolt 23 slightly compresses the sleeve 24 and produces a bundle of substantially parallel filaments distributed with a degree of randomness at their tips.

The tufts of filaments 10 are bolted to the outstanding flange of the angle bar 17 on the trailing face of the outstanding flange of the bar, relative to the direction of rotation of the rotor. In use the front wall of each angle bar 17 shrouds the lower part of the tuft of filaments 10 in the channel of the angle bar.

In FIG. 4 there is shown from the underside a perspective view of the stationary brush 15 shown in FIGS. 1 and 2. The tufts of filaments 10 may conveniently be identical to the filament tufts shown in FIG. 3, except that the angle bars 17 are bolted to a support plate 25 (omitted from FIG. 1 for simplicity) secured to the underside of the hood 13.

In FIGS. 2, 3 and 4, the filaments 10, conveniently of polypropylene or nylon, are shown as having a circular cross-section. Whilst such a cross-section gives an acceptable performance, a preferred cross-section is trilobate. Such a cross-section is shown in FIGS. 5, 6 and 7, which also illustrate an alternative form of mounting of the tufts of filaments 10. In the modification of FIGS. 5, 6 and 7, the tufts of filaments are held within the protective sleeves 24 by two bolts 23' and 23'' and the outer bolt 23' has an internal spacing washer 26 which maintains the filaments on either side of the washer in two separate tufts, rather than a single tuft emerging from the sleeve 24 as shown in FIGS. 2, 3 and 4.

Returning now to consideration of the general principle of operation of the apparatus shown in FIGS. 1 to 4, the conditioning apparatus 11 is positioned as has been described behind a drum type rotary mower, and the entire assembly is either tractor mounted or tractor towed in known manner, and is driven from the power take-off (p.t-o.) of the tractor. In use the cut crop from the cutter 19 is conveyed into the passage 14 by the rotary brush 12. The presence in the passage 14 of the stationary brush 15 restrains the conveyed crop and thereby causes slippage between the crop and the rotary brush 12. Relative movement of the crop rearwardly relative to the filaments of the rotary brush 12 and forwardly relative to the filaments of the stationary brush 15 is thus induced. Said movement causes the filaments of both brushes 12 and 15 to condition the crop by surface damage. Although the precise conditioning effect will vary according to the crop and the operating conditions, it is expected that normally the conditioning is effected by the filaments of the brushes abrading the surface of the crop, although in some cases surface damage by multiple lesions and gentle multiple impact of the tips of the conditioning elements may also be caused. The object of such surface conditioning of the crop is the removal or displacement of the epicuticular wax and surface damage of the cuticle. Conveniently the rotor 12 is rotated at a speed such as to throw off the crop to fall downwardly to the ground. In some arrangements there may be provided an optional stripping rotor of known kind (shown in later Figures) for stripping off the rotor any crop remaining as the filaments approach the arcuately downward portion of their paths. Such a stripping rotor would operate in the same sense of rotation as the rotor 12. Crop from the conditioning device falls onto the stubble in a loosely structured swath or windrow which has good resistance to settling.

Now it is to be particularly appreciated that although the apparatus shown in FIGS. 1 to 7 has been described in terms of apparatus for conditioning crop, it is the pick-up and conveying function of the rotor 12 which embodies the present invention in this apparatus. The stationary brush 15 is an optional item which is introduced in order to partially restrain crop so as to increase the crop conditioning effect. Even with the stationary brush 15 present, the apparatus of FIGS. 1 to 4 embodies the present invention, in that a pick-up and conveying function is excercised, but it is preferred that the stationary brush is absent when the rotor 12 is intended to carry out solely or predominantly a pick-up and conveying function. In FIGS. 1(a), 2(a) and 3(a), there is shown a modification of the apparatus of FIGS. 1,2,3 and 4 from which the stationary brush 15 has been removed, so that the rotor 12 may exercise solely or predominantly a pick-up and conveying function. Although in such a case the rotor 12 may deposit the crop back onto the ground, for example for hay making, it will normally be the case that the rotor 12 will direct the crop at the rear to a baler or chopper of a forage harvester (not shown), or to some other collecting means, along a channel indicated generally at 14'. In general, the components shown in FIGS. 1(a), 2(a) and 3(a) correspond to those shown in FIGS. 1 to 7, and the previous description in general applies.

It will be appreciated that in other embodiments described in this specification, where a second brush-like, other, component is provided to increase or modify a conditioning effect, such a component is optional so far as the present invention is concerned.

The devices of the present invention are susceptible to a wide measure of variation, and there will now be described a large number of alternative forms of the devices themselves, and of the configurations of such devices within a conditioning apparatus. It will be appreciated that the various different devices (generally called brushes in this description) are interchangeable within the various configurations described.

Referring firstly to FIG. 4, it will be noted that the tufts of filaments 10 are fairly closely spaced together, and that tufts in succeeding rows are offset from each other so that a tuft in one row fills the gap between tufts in a preceding tow. The tufts on the rotary brush 12 are similarly offset from each other. In modifications of such tuft arrangements, the tufts may be spaced apart more widely and the gaps between tufts in one row may be filled not entirely by tufts in the succeeding row out by combinations of staggered tufts in the next two or even more rows. With such an arrangement it may be advantageous to set the tufts of filaments along helical patterns so as to exert on the crop a degree of movement along the axis of the rotary brush, that is to say transversely relative to the passage 14.

Figure 8A:
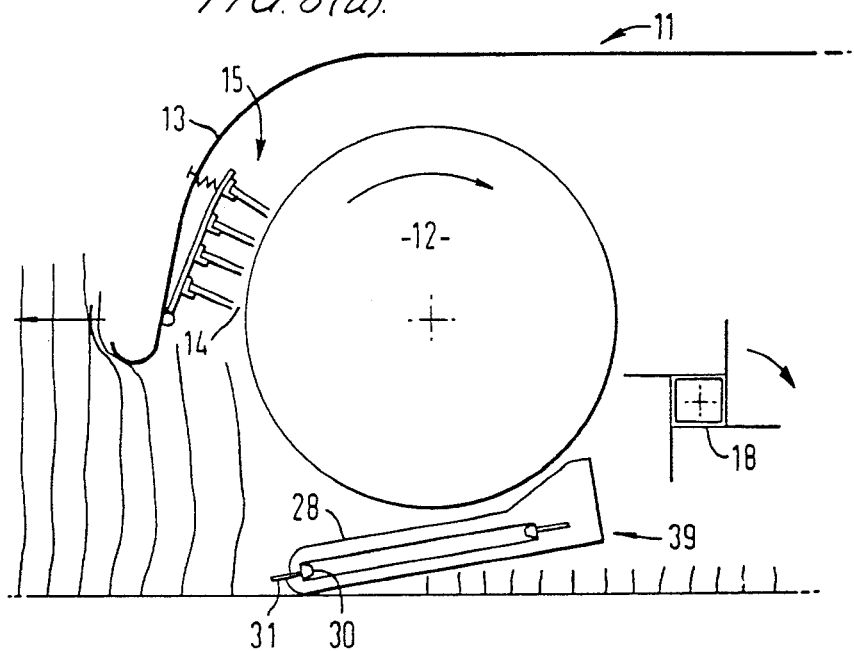
FIG. 8(a) is a diagrammatic side view of apparatus similar to that shown in FIG. 1 but arranged for use with a belt mower.
Figure 8B:
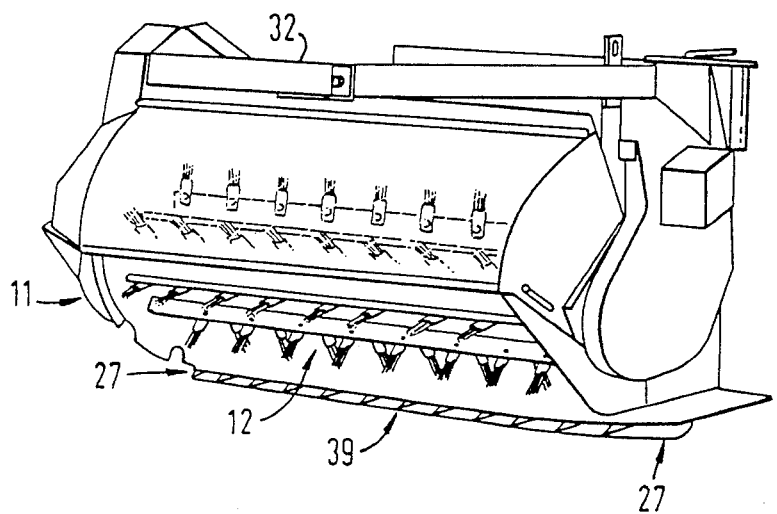
FIG. 8(b) is a front perspective view of the apparatus shown in FIG. 8(a)

There will now be described with reference to FIGS. 8(a) and 8(b) a modification of a cutter and conditioning device combination embodying the invention which make particular use of the helical patterns of tufts referred to above. FIG. 8(a) shows a diagrammatic side view corresponding generally to FIG. 1 of a conditioning apparatus indicated generally again at 11 and positioned over a belt mower 39. Such a belt mower 39 is known in itself and comprises a flat casing 28 in which are housed two horizontally spaced pulleys (the positions of which are indicated generally at 27 in FIG. 8(b)) around which is entrained a belt 30 carrying outwardly directed cutting elements 31. The cutting is effected (in known manner) by unidirectional movement of the knives 31 over substantially all of the front traverse of their path although some cutting is effected by a part circular path of the cutting knife 31 as it moves around the pulleys 27. The conditioning device 11 operates in generally the same manner as described with reference to FIG. 1, the brushes 12 and 15 being indicated diagrammatically by the same reference numerals as in previous Figures. In FIG. 8(b) there is shown the main frame 32 on which the conditioning device 11 and the belt cutter 39 are both mounted, to be driven from the p.t-o. of the tractor on which the frame 32 is mounted.

Figure 8C:
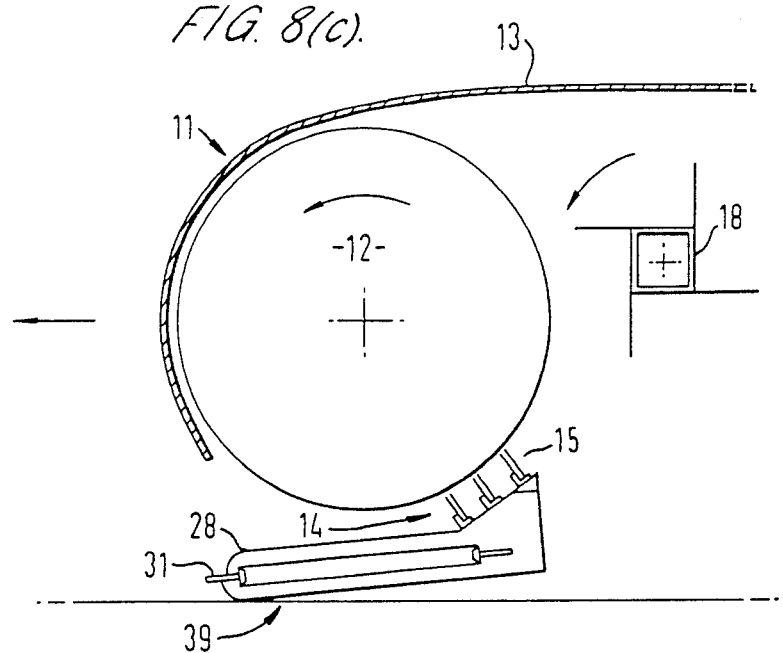
FIG. 8(c) is a diagrammatic side view of a modification of the apparatus shown in FIG. 8(a) the modification including reversal of rotation of a rotor shown in the apparatus and addition of a crop stripping and flow diverting rotor.

In FIG. 8(c) there is shown a modification of the apparatus shown in FIGS. 8(a) and 8(b) in which the sense of rotation of the rotary brush 12 is reversed so that the rotary brush clears crop away from the belt mower 39 by sweeping the crop rearwardly across the top of the casing 28 rather than lifting the crop up and over the rotor 12. To the rear of the casing 28 of the belt mower 39 is provided a stationary brush 15 acting as a conditioning device and producing a conditioning action corresponding to the action of the stationary brush 15 in the preceding embodiments. In this embodiment, the passage 14 through which the crop is conveyed is defined between the rotary brush 12 and the top of the casing 28 continued back to the stationary brush 15. Behind the stationary brush 15 is a stripping rotor 18 (of known kind) which rotates in the same sense as the rotary brush 12, and strips crop from the brush 12 and directs it downwardly to the ground.

There will now be described with reference to FIG. 9(a) an alternative arrangement of conveying rotor and crop flow modifying means in which the crop flow modifying means is active rather than stationary. FIG. 9(a) is a side view in cut-away form of apparatus 11 for picking up and conveying cut crop (also constituting conditioning apparatus) suitable for trailing behind a tractor and for conditioning previously cut crop lying on the ground. (It will be appreciated that the use of the device to be described is not precluded from operation with a cutting means for cutting standing crop in modifications of the apparatus.) The conditioning apparatus 11 has several elements in common with the previously described apparatus and such common elements will be indicated by like reference numerals. The apparatus 11 comprises a rotary brush 12 mounted for rotation in bearings 34 mounted on part of the main frame 32 of the conditioning apparatus. The frame is mounted for movement over the ground level indicated at 35 in the direction from right to left in the Figure as indicated by the arrow, and the rotary brush 12 is coupled by gearing (not shown) to the p.t-o. of the towing tractor and arranged to be driven in a clockwise direction as indicated by the arrow.

A hood 13 extends from a position in front of the rotor 12 upwardly and rearwardly to terminate at a supporting member 36 positioned at about the '11 o'-clock' position in relation to the rotor 12. Above and slightly to the right of the member 36 is positioned a second conditioning device in the form of a second rotary brush 37 constructed in similar manner to the main rotary brush 12, but of smaller diameter, and having fewer rows of tufts of filaments angularly spaced around the rotor. The rotary brush 37 is mounted for rotation in bearings 38 suspended from an upper frame member also forming part of the main framework 32 of the apparatus. The rotary brush 37 is coupled to the gearing of the main brush 12 and arranged to be driven in the opposite sense to the rotation of the main rotor 12, as indicated by the arrow.

In different arrangements of this embodiment, the second rotor 37 may be positioned at different angular positions relative to the rotor 12 (for example between the 9 o'clock and 12 o'clock positions). Other factors which can be varied include the relative and absolute rates of rotation of the brushes 12 and 37, the brush diameters and the degree of spacing apart, or overlap, of the tips of the opposed filaments of the two brushes.

As can be seen from FIG. 9(a), the mountings of the filaments may correspond exactly to the mountings described with reference to FIGS. 2, 3 and 4, or as modified in FIGS. 5, 6 and 7. By way of example the diameter of the rotary brush 12 may be 560 mm, and the diameter of the secondary rotary brush 37 may be 410 mm. By way of example of ranges of diameters which may be used, the diameter of the lower rotos 12 may be in the range 350 mm to 700 mm, and the diameter of the rotor 37 may be in the range 700 mm to 350 mm.

FIG. 9(b) shows in diagrammatic form a slightly modified arrangement of the embodiment of FIG. 9(a), in which the rotor and hood configuration are varied.

FIG. 9(c) shows in diagrammatic form a modification of the embodiment of FIG. 9(a), in which the secondary rotor 37 is arranged to rotate in the same sense as the main rotor 12. The secondary rotor 37 is repositioned at a position corresponding to '9' o'clock', and the hood 13 of FIG. 9(a) is replaced by a two-part hood around the main rotor. A plate 103 extends horizontally to define with the brush 12 a downstream part 14a of the passage, and a curved front plate 105 extends in front of the brush 37 to define therewith an upstream part 14b of the crop passage. In use the main rotary brush 12 is rotated clockwise as shown in FIG. 9(c) and the secondary rotary brush 37 is rotated in the same sense at a rate of rotation which provides a substantially slower velocity at its filament tips than at those of the main brush 12. The two sets of the filaments abrade and thereby condition the crop in generally the same manner as has been described in the preceding embodiments, with each acting as crop stripping means for the other.

Referring now to FIG. 9(d), a crop conditioning apparatus generally indicated at 11 is of similar construction to the device 11 in FIG. 9(c), and identical reference numerals are used to identify similar parts. However in the apparatus of FIG. 9(d) the secondary brush 37 is arranged to be driven in the opposite rotational sense to the main brush 12 and the front plate 105 is shorter and shaped to terminate slightly rearwardly and below the upper extremity of the secondary brush 37. The apparatus 11 operates in similar manner to the apparatus of FIG. 9(c) except that the filaments of the brushes 37 and 12 are moving in the same linear direction but at different speeds when they contact the crop. FIG. 9(e) shows a further alternative arrangement, similar to that of FIG. 9(d).

The crop conditioning apparatus of FIGS. 9(c) and 9(d) can be used as pick-up conditioners for collecting previously cut crop on the ground, or as replacements for the crop conditioning apparatus shown in preceding embodiments in combination with a mower.

It is to be appreciated that there may be provided in accordance with the invention in some aspects a two brush arrangement in which both brushes are of equal size and driven at identical peripheral linear speed and direction, but the cooperating position of the brushes is such that transverse rows of filaments intermesh in the manner of two gear wheels, that is to say have a negative clearance.

It is to be appreciated that although the various forms of apparatus shown in FIGS. 9(a) to (e) have been described in terms of apparatus for conditioning crop, it is the pick-up and conveying function of the rotor 12 which embodies the present invention in the apparatus. The secondary brush 37 is an optional item, but even with the brush 37 present, the apparatus of FIGS. 9(a) to 9(e) embodies the present invention, in that a pick-up and conveying function is exercised. In FIG. 9(f) there is shown a modification of the apparatus of FIG. 9(a) from which the secondary brush 37 has been removed, so that the rotor 12 may exercise solely or predominantly a pick-up and conveying function in picking up cut crop from the ground. Although in such a case the rotor 12 may deposit the crop back onto the ground, for example for hay making, it will normally be the case that the rotor 12 will direct the crop at the rear to a baler or the chopper of a forage harvester, or to some other collecting means, along a channel indicated generally at 14'. Such an arrangement is shown in FIGS. 9(g) and 9(h). In general, the components shown in FIG. 9(f) correspond to those shown in FIG. 9(a) and the previous description in general applies.

It is a generally desirable feature of a pick-up brush mechanism, that the horizontal clearance between the rotor and the housing at the front entrance is small, and that thereafter the clearance increases rapidly, becoming several times the initial clearance above the rotor top-dead-centre position. This is so that the crop is effectively accelerated and is then immediately allowed to detach itself from the brush filaments.

It will be appreciated that in other embodiments described in this specification, where a secondary rotor is provided to increase or modify a conditioning effect, such a component is optional so far as the present invention is concerned.

In some arrangements the apparatus is arranged for collection of crop during movement of the frame over the ground and for depositing of the lifted crop back onto the ground after the pick-up action. In other arrangements the apparatus may be arranged for collection of crop during movement of the frame over the ground and for feeding the lifted crop directly into the feed intake of a harvesting machine, such as a chopper or baler. In yet other arrangements the apparatus may be combined with a mowing machine, such as a drum, disc, belt or reciprocating knife mower, for collecting the crop from the mower before or after it falls to the ground and for conditioning and conveying the cut crop immediately into the feed intake of a harvesting machine, such as a chopper or baler.

There will now be described a number of other variations and modifications of the filaments which may be used, and of the configurations of conditioning devices, passageways and cutting devices which may be used. It will be appreciated that many of these variations may form permutations not specifically indicated among the various features described.

FIG. 10 illustrates in diagrammatic side view, partly in cross-section, a modification of the crop conditioning apparatus shown in FIG. 1, in which the drum mower 19 is replaced by a disc mower 29. The hood 13 is extended forwardly over the disc mower 29, as compared with the device of FIG. 1. The apparatus shown in FIG. 10 includes a stripping rotor 18, which has been mentioned as an optional feature, and which can be utilised in combination with the apparatus of FIGS. 1 and 8(a) and as appropriate with other embodiments. In FIG. 10, the stripping rotor 18, which may be of known design but with its paddles consisting preferably of yielding material, is rotated in the same sense as the rotary brush 12, and acts to strip crop off the brush 12.

In FIG. 11 a further modification of the apparatus shown in FIG. 1 includes a modified stationary brush 15 which is arcuate and is pivoted at 16 to the hood 13 at the forward end of the passage 14 and extends rearwardly along the passage to restrain the crop flow therethrough. (Similar pivoted arrangements have been shown but not described in earlier Figures). The distal end of the brush is supported by spring loaded support 17' extending from the hood 13 and adjustable to vary the angular position of the brush 15 about its forward pivot 16. An optional stripping rotor 18 is provided to remove conditioned crop from the brush 12 and discharge it onto the ground in a swath or windrow. The brush 15 of FIG. 11 may be of the same form as described with reference to FIG. 1, and other Figures, or alternatively may comprise individual filaments, not in tufts, and of somewhat larger diameter than those described hereinbefore.

Referring to FIG. 12, a crop conditioning apparatus 21 differs from FIG. 11 in that the stationary brush 15 is straight not arcuate. Further, the conditioning apparatus is combined with a disc mower 29 instead of the drum mower 19 of FIG. 11. The combined mower conditioner of FIG. 12 operates in substantially the same manner as that of FIG. 11 except for the manner in which the crop is cut and delivered to the crop conditioning apparatus from the disc mower, this manner of delivery being generally known in itself.

FIG. 13 shows a crop conditioning apparatus 31 modified from that shown in FIG. 12 in that the disc mower 29 is replaced by a belt mower 39.

In this connection, it should be appreciated that the crop conditioners of FIGS. 11 to 13 can readily be adapted as pick-up conditioners (i.e. for picking up cut crop from the ground, conditioning it and returning it to the ground in a swath or windrow) by removal of the cutter and appropriate choice of rotary brush construction. Modification of the hood 13 may also be required to ensure proper direction of the picked-up crop into the passage 14. The said pick-up conditioner can be tractor-mounted or trailed in the same manner as the mower-conditioners of FIGS. 11 to 13.

Referring now to FIG. 14, there is illustrated another crop conditioning apparatus (generally indicated at 51) which differs from the previous apparatus in the construction of the rotary brush 12 which will be described hereinafter.

FIG. 15 also illustrates an alternative crop conditioning apparatus (generally indicated at 61). The apparatus of FIG. 15 differs from the apparatus in FIG. 14 in the construction of the rotary brush which will be described hereinafter.

In FIGS. 14(a) and 15(a) there are shown modifications of the apparatus shown in FIGS. 14 and 15 respectively, in which the stationary brush 15 has been removed so that the rotor 12 exercises solely or predominantly a pick-up and conveying function. The crop picked up is directed to a collecting means (not shown) along a channel 14'.

The manner of operation of the conditioning apparatus 51 and 61 of FIGS. 14, 14(a), 15 and 15(a) are substantially identical with that of apparatus 11 and therefore will not be described.

Referring now to FIG. 16, a crop conditioning apparatus is generally indicated at 91 in a mode intended for use as a pick-up conditioner. The apparatus 91 can readily be adapted for use in a mower by replacing the intake plate 96 (see below) with a shorter plate or removing said plate 96. The brush 92 of apparatus 91 can be any of the rotary brushes described above. The brush 95 is pivoted at 98a to a support plate 98 which is spatially fixed relative to the brush 92. A spring 99 acts between the support plate 98 and the lower end of the brush 95 to urge the upper end of the brush 95 against a stop 98b on the plate 98. The intake plate 96 depends below the brush and is fixed relative to support plate 98. A curved swath deflector plate 97 is provided to direct conditioned crop passing between the brush 92 and a hood 93 into a substantially horizontal path on leaving the conditioning device. The plate 97 causes the swath to be spread upwards into a more loosely arranged swath than if it fell, or was driven, onto the ground from above.

In use, the apparatus 91 operates in similar manner to machine 51 of FIG. 14 except that the sprung and pivotal mounting of the brush 95 automatically compensates for variations in the rate of feed of crop into the device.

The rotor 12 shown in FIG. 14 has a plurality of circumferentially spaced axially extending ribs 2c from each of which protrude two parallel rows of 6 mm diameter polypropylene rods 2d. Each pair of circumferentially adjacent rods 2d is constituted by the respective ends of a "U"-shaped length of rod having its base secured in the respective rib 2c.

FIGS. 15 and 17 show examples of brushes in which a plurality of circumferentially spaced axially extending ribs 2c projects from a cylindrical drum 2a. These ribs 2c have a radially extending rear (with respect to the direction of rotation of the brush) face and a shorter radially extending front face, said faces being joined by a convexly arcuate upper face. Tufts 2b protrude radially immediately forwardly of the front face. Each pair of adjacent tufts 2b is constituted by a bundle of cylindrical polypropylene rods of 3 mm diameter or trilobate polypropylene rods of 3 mm diameter lobes. Suitably there are about 50 of the cylindrical rods or 6 to 8 of the trilobate rods in each bundle. The bundle is bent into a "U"-shape and the base thereof is clamped to the front face of the rib 2c by a metal plate (not shown) in similar manner to that described herein with reference to FIG. 3. In use, the ribs 2c constitute a shroud for the lower part of the following tuft 2b and the curved upper face of the ribs 2c limit the extend to which the preceding tuft 2b can bend.

Referring to FIG. 18, a brush has the same basic construction as that of FIG. 17 described above. However it also has pairs of rearwardly curved bars 2j protruding from the drum 2a to provide guards for the tufts 2b. The bars 2j of each pair are located on respective sides of a tuft 2b whereby the tuft can bend between the bars and thereby be protected against excessive bending and shear or impact damage by stones or other extraneous lumps of material.

It will be appreciated that the invention is not restricted to the details described above with reference to the drawings but that numerous modifications and variations of said details can be effected without departing from the scope of the invention. In particular, the rods of the bushes can be of other materials than polypropylene which have the desired stiffness and wear characteristics, for example nylon. Further, the rods can be of other cross-sections than circular or trilobate, for example annular, triangular, rectangular or square, and can be secured in the brush in any suitable manner.

Typically, the main rotary brushes 12, and the rotary conveyor 72 will have an overall diameter in the range 400 to 600 mm, e.g. 560 mm, and will be rotated at speeds in a range 400 to 800 rev/min, or in some cases 500 to 1000 rev/min. Their axial length, and that of brushes 15, and plate 96, will be chosen having regard to the desired width of cutting crop to be conditioned and the severity of treatment required. The free length of the filaments or rods of said brushes (both rotary and stationary) is preferably in a range 80 to 200 mm, or may be between 50 and 100 mm; the individual rods or tufts in each row may be spaced between 35 and 200 mm apart, for example between 35 and 130 mm apart, and the adjacent rows are spaced apart by about 25 mm in the stationary brushes and rows 2d on each rib 2c of device 51, about 90 mm in brush 12 of device 41, or about 220 mm in the brush 12 of FIG. 16.

As has been mentioned, there may be provided adjustment of severity to crop treatment. The principal variables are stiffness of the filaments, rotor diameter and speed and the clearance between the conveying and slip inducing means, i.e. crop flow modifying means. Stiffness of filaments is determined largely by their free length, their cross-sectional area and shape and the type of material from which they are made.

I claim:

1. Apparatus for picking up and conveying cut grass and other cut fibrous fodder crop, comprising a mobile frame for movement over the ground, a crop conveying rotor for picking up and conveying cut grass and other cut fibrous fodder crop, said rotor being mounted on said mobile frame in a position close to the ground for picking up crop from the ground, but with the lowest part of said rotor spaced from the normal ground surface, said conveying rotor comprising a brush-like structure having a multiplicity of stiff, resilient, outwardly directed, elongate elements for picking up and conveying the crop by an action including relative movement between the conveying elements and the crop engaged thereby, the elements being yieldable in response to engagement with the crop but being sufficiently stiff to penetrate at least part of a stream of crop conveyed by the rotor, the elements being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements, said brush-like structure comprising spaced-apart, discrete tufts of crop engaging elements, each tuft being formed of a plurality of lengths of resilient, synthetic material doubled over and secured to a supporting base by a securing member passing through the fold of the doubled-over elements lengths, the doubled-over material being secured in a sleeve of resilient material which supports and protects the tuft of elements at the base thereof, the discrete tufts of elements being arranged so that tufts which are adjacent to each other along a direction parallel to the axis of rotation of the rotor are spaced-apart from each other at the distal ends of the tufts so as to leave gaps between adjacent tufts, the axial positions of the brush tufts being staggered around the rotor so that upon rotation of the rotor the gaps between the spaced-apart tufts presented to the crop are filled at least partly by succeeding tufts presented to the crop during the rotation, a housing extending over the front of the crop conveying rotor and forming a crop flow passage between the rotor and the housing, outlet means forming an outlet from said passage leading rearwardly from said rotor for discharging crop released by the rotor, and drive means for rotating the crop conveying rotor about an axis substantially parallel to the ground in such a manner as to pick-up cut crop and convey the crop upwardly and rearwardly over the rotor along the passage, said drive means including means for coupling said rotor to a power source for driving said rotor in rotation independently of forward movement of the mobile frame and at a rotational speed sufficient to pick-up the crop by a stiff brushing action and to detach crop from the rotor by centrifugal effect and discharge the crop rearwardly through said rearward outlet formed by the outlet means.

2. Apparatus according to claim 1 in which the tufts are spaced apart in the said direction with a spacing in the range 20 to 150 mm.

3. Apparatus according to claim 2 in which the said spacing is in the range 40 to 130 mm.

4. Apparatus according to claim 1, in which the population of the elements in each tuft at the tips lies in the range 1 to 20 elements per sq. cm.

5. Apparatus according to claim 1 in which the ratio of the sides of a rectangular envelope containing a cross-section of an element does not exceed 4 to 1.

6. Apparatus according to claim 1 in which the maximum cross-sectional dimension of an element is in the range 1 mm to 20 mm.

7. Apparatus according to claim 6 in which the said maximum cross-sectional dimension is in the range 3 to 10 mm.

8. Apparatus according to claim 1 in which the free bendable length of each element lies in the range 10 to 300 mm.

9. Apparatus according to claim 8 in which the said free bendable length lies in the range 25 to 250 mm.

10. Apparatus according to claim 1 in which the elements are of trilobate cross-section.

11. Apparatus according to claim 1 in which the elements are made of nylon, polypropylene, glass fibre, or carbon fibre, or any of these materials impregnated, studded or tipped with metallic or mineral abrasives.

12. Apparatus according to claim 1 in which the elements are yieldable by bending substantially along the whole of the free lengths thereof.

13. Apparatus according to claim 1, in which the conveying rotor elements are arranged in a helical formation along the axis of the rotor.

14. Apparatus according to claim 1 in which the rotor is arranged for collection of crop during movement of the frame over the ground and for depositing of crop onto the ground after engagement by the rotor.

15. Apparatus according to claim 1 in which the drive means is arranged for driving the conveying rotor at a rotational speed of 400 to 1700 rev/min.

16. Apparatus according to claim 1 in which the drive means is arranged for driving the conveying rotor at a rotational speed such as to provide a velocity in the range 10 to 50 m per second at the tips of the elements.

17. Apparatus according to claim 1 including a second rotor, the first and second rotors being positioned on opposed sides of the pathway for movement of the conveyed crop.

18. A method of picking up and conveying cut grass and other cut fibrous fodder crop, comprising the steps of rotating a crop conveying rotor about an axis which is substantially parallel to the ground in such a manner as to pick up cut fibrous fodder crop lying on the ground, the conveying rotor comprising a brush-like structure having a multiplicity of stiff resilient outwardly directed elongate elements of resilient, synthetic material for picking up and conveying the crop, and picking up and conveying cut fibrous fodder crop from the ground by the rotor in a brushing action, and conveying the crop upwardly and rearwardly over the rotor along a crop flow passage formed between the rotor and a housing extending over the front of the crop conveying rotor, said brushing action comprising engaging cut fibrous fodder crop by spaced apart discrete tufts of crop engaging elements, the elements being arranged so that discrete tufts which are adjacent along a direction parallel to the axis of rotation of the rotor are spaced apart from each other at the distal ends thereof, presenting to the crop during rotation of the rotor a series of arrays of the said spaced-apart tufts with gaps therebetween and subsequently presenting spaced-apart tufts which are staggered along the axial length of the rotor so that gaps between spaced apart tufts presented to the crop are filled at least partly by succeeding tufts in the next array, producing relative movement between the cut fibrous fodder crop and said spaced-apart tufts of elements, penetrating at least part of the stream of crop by said spaced-apart tufts of stiff resilient elements, producing yielding of the stiff resilient elongate elements in response to engagement with the crop at least predominantly by bending of the elements along at least part of the crop engaging portions of the lengths thereof, effecting return of the elements to their undeflected dispositions when free from engagement with the crop at least predominantly by the effect of the stiffness of the elements, and subsequently releasing the cut fibrous fodder crop from the said spaced-apart tufts of elements at least predominantly by the effect of centrifugal force on the crop, and discharging the crop rearwardly from the rotor.

19. A method according to claim 18 including the step of depositing the crop onto the ground after engagement by the rotor elements.

20. A method according to claim 18 including the step of driving the conveying rotor at a rotational speed of 400 to 1700 rev/min.

21. A method according to claim 18 including the step of driving the conveying rotor at a rotational speed such as to provide a velocity in the range 10 to 50 m per second at the tips of the elements.

* * * * *